US009605384B2

(12) United States Patent
Thompson

(10) Patent No.: US 9,605,384 B2
(45) Date of Patent: Mar. 28, 2017

(54) HYDROPHOBIC PAPER, CARDBOARD, AND PACKAGING

(71) Applicant: STL SUSTAINABLE TECHNOLOGIES, LLC, St. Louis, MO (US)

(72) Inventor: Michael M. Thompson, St. Louis, MO (US)

(73) Assignee: STL Sustainable Technologies, LLC, St. Louis, MO (US)

( * ) Notice: Subject to any disclaimer, the term of this patent is extended or adjusted under 35 U.S.C. 154(b) by 21 days.

(21) Appl. No.: 14/326,198

(22) Filed: Jul. 8, 2014

(65) Prior Publication Data

US 2014/0322395 A1 Oct. 30, 2014

Related U.S. Application Data

(63) Continuation of application No. 13/580,115, filed as application No. PCT/US2011/025765 on Feb. 22, 2011.

(60) Provisional application No. 61/349,575, filed on May 28, 2010, provisional application No. 61/306,120, filed on Feb. 19, 2010.

(51) Int. Cl.

| D21H 21/16 | (2006.01) |
| D21H 17/13 | (2006.01) |
| C04B 24/42 | (2006.01) |
| C04B 28/02 | (2006.01) |
| C04B 28/14 | (2006.01) |
| C09D 183/04 | (2006.01) |
| B32B 13/08 | (2006.01) |
| A63C 5/12 | (2006.01) |
| B27K 3/15 | (2006.01) |
| C04B 111/00 | (2006.01) |
| C04B 111/28 | (2006.01) |

(52) U.S. Cl.
CPC ............ *D21H 21/16* (2013.01); *B32B 13/08* (2013.01); *C04B 24/42* (2013.01); *C04B 28/02* (2013.01); *C04B 28/14* (2013.01); *C09D 183/04* (2013.01); *A63C 5/126* (2013.01); *B27K 3/156* (2013.01); *B27K 2240/70* (2013.01); *C04B 2111/0062* (2013.01); *C04B 2111/28* (2013.01); *Y02P 20/125* (2015.11); *Y10T 156/10* (2015.01); *Y10T 428/31663* (2015.04)

(58) Field of Classification Search
USPC .......................................... 162/158; 426/106
See application file for complete search history.

(56) References Cited

U.S. PATENT DOCUMENTS

| 3,389,042 | A | * | 6/1968 | Bieri | ...................... B32B 27/00 |
| | | | | | 156/44 |
| 4,406,738 | A | | 9/1983 | Fink et al. | |
| 5,061,346 | A | * | 10/1991 | Taggart | ................... D21H 17/00 |
| 5,073,195 | A | * | 12/1991 | Cuthbert | .............. C04B 41/4944 |
| | | | | | 106/2 |
| 5,221,435 | A | * | 6/1993 | Smith, Jr. | ............... D21H 17/66 |
| 5,695,551 | A | * | 12/1997 | Buckingham | ......... C04B 41/009 |
| | | | | | 106/2 |
| 6,403,163 | B1 | * | 6/2002 | Fisher | ..................... C04B 24/42 |
| | | | | | 106/2 |
| 6,492,450 | B1 | | 12/2002 | Hsu | |
| 7,128,778 | B2 | | 10/2006 | Thompson | |
| 7,192,470 | B2 | | 3/2007 | Neal et al. | |
| 7,267,714 | B2 | | 9/2007 | Thompson | |
| 7,300,502 | B2 | | 11/2007 | Thompson | |
| 7,704,561 | B2 | | 4/2010 | Mehta et al. | |
| 7,754,288 | B2 | | 7/2010 | Neal et al. | |
| 7,758,924 | B2 | | 7/2010 | Thompson | |
| 7,838,124 | B2 | | 11/2010 | Thompson | |
| 7,846,505 | B2 | | 12/2010 | Neal et al. | |
| 7,964,287 | B2 | | 6/2011 | Thompson | |
| 2005/0155733 | A1 | | 7/2005 | Asano et al. | |
| 2007/0107630 | A1 | | 5/2007 | Neal et al. | |
| 2008/0014110 | A1 | | 1/2008 | Thompson | |
| 2008/0047460 | A1 | | 2/2008 | Neal et al. | |
| 2008/0047467 | A1 | | 2/2008 | Thompson | |
| 2009/0025880 | A1 | | 1/2009 | Hennis et al. | |
| 2009/0053545 | A1 | | 2/2009 | Neal et al. | |
| 2009/0214688 | A1 | | 8/2009 | Hakoda et al. | |
| 2009/0252873 | A1 | | 10/2009 | Cameron et al. | |
| 2009/0261297 | A1 | | 10/2009 | Neal et al. | |
| 2012/0247363 | A1 | * | 10/2012 | Lecomte | ................. C04B 24/42 |
| | | | | | 106/2 |

OTHER PUBLICATIONS

International Search Report, PCT/US2011/25765, dated Jun. 21, 2011, 7 pages.
Written Opinion, PCT/US2011/25765, dated Jun. 21, 2011, 7 pages.
International Preliminary Report on Patentability, PCT/US2011/25765, dated Aug. 21, 2012, 9 pages.

* cited by examiner

*Primary Examiner* — Dennis Cordray
(74) *Attorney, Agent, or Firm* — Senniger Powers LLP

(57) ABSTRACT

A process for the manufacture of hydrophobic paper using a pulp comprising a slurry of cellulosic fibers in an aqueous medium comprising an alkoxysilane. A paper or cardboard packaging product comprising cellulosic fibers having a silane residue substantially uniformly distributed throughout the paper or cardboard and bonded to the cellulosic fibers predominantly through Si—O— bonds.

25 Claims, No Drawings

HYDROPHOBIC PAPER, CARDBOARD, AND PACKAGING

REFERENCE TO RELATED APPLICATIONS

This application is a continuation of U.S. application Ser. No. 13/580,115, filed Nov. 8, 2012, which is a U.S. National stage application of International Patent Application No. PCT/US2011/025765, filed Feb. 22, 2011, and claims the benefit of U.S. Provisional Application No. 61/306,120, filed Feb. 19, 2010 and U.S. Provisional Application No. 61/349,575, filed May 28, 2010, the entire disclosures of which are incorporated herein by reference.

BACKGROUND OF THE INVENTION

This invention relates to preserving and water-proofing of articles and materials such as wood, drywall, paper, other wood products, fabric, and concrete, to methods for producing hydrophobic materials and products, and particularly to the preparation and use of silane formulations for such purposes.

The utility of wood has been known for millenia, and the utility of wood products such as paper has been known for centuries. Wood has been as a weapon, a fuel source especially a material for the construction of items useful for society. Construction materials for the building of homes, boats, fences, telephone poles and furniture are but a few of the most common uses for wood.

However, throughout the history of man and his use of wood, this material has suffered from well known deficiencies, especially where wood products are used or stored in an outdoor environment.

Untreated wood and wood products typically begin to degrade after a brief period of exposure to sun, rain, seawater or potable water. Repeated wetting and drying cycles or freeze and thaw cycles can cause the wood to expand and contract to the point of destroying the wood product. Typically the wood will deform by swelling, warping and later cracking. Wood that contains more than 25% water will begin to rot. The formation of mold and mildew throughout the interior and exterior of the wood product will also take place and facilitate the degradation of the wood.

The exterior exposure of wood and wood products also renders the product vulnerable to insect damage. Termites, carpenter bees, ants and others species are known to degrade wood to the point where it is useless and turn the wood into dust. In some cases, the synergistic effects of both insects and weather work to quickly destroy wood. All of these degrading activities require the eventual repair and/or replacement of said wood products.

As a consequence, wood products, while ubiquitous and highly useful, generally have a limited lifetime, in some circumstances so limited as to exclude wood as a viable material of construction, paper as a medium for recording information, etc. Concrete products are also subject to deterioration from frequent and/or persistent infiltration of water and aqueous electrolytes under service conditions. As water penetrates, thermal expansion and contraction during the summer and ice expansion an contraction during winter commonly cause concrete to crack and fragment.

Thus, there has been a long-standing need for a preservation composition that meets the requirements of hydrophobicity and insecticidal properties, and that is economical, easy and safe to prepare and apply and possess an extended lifetime of service without losing potency.

Thompson U.S. Pat. No. 7,128,778 describes methods for treating wood or wood products comprising application of formulations containing boron, methyltrichlorosilane and an organic solvent such as tetrahydrofuran or a lower alkane. The process renders the treated wood products fire-resistant, water-resistant and wood consuming insect-resistant. Similar and related formulations and methods are described in Neal et al. U.S. Pat. No. 7,192,470, Thompson U.S. Pat. No. 7,267,714, and Thompson U.S. Pat. No. 7,300,502. Various related applications remain pending, including US 20090252873, US 20080047460, US 20080047467, US 20090053545, US 20090214688, US 20090261297, US 20070107630 and US 20080014110.

Kelsoe U.S. Pat. No. 6,902,767 describes treatment of wood with formulations comprising halosilanes, hydroxysilanes and alkoxysilanes in a water-miscible organic solvent. Water can optionally be present in very minor proportions, but is preferably excluded from the formulations. Specific silanes used in the Kelsoe formulations include methyltrichlorosilane. The formulations can also include boron compounds. The drawings depict structures that Kelsoe believe to be formed by reaction of the silane, the boron compound, or both with cellulose of the wood or wood product. Where the formulation contains a hydroxy or alkoxysilane, it preferably also contains a mineral acid which catalyzes reaction of the silane compound with cellulose.

Although the Thompson '778 formulations impart desirable properties to wood, paper, or other wood products, and the Kelsoe formulations are said to achieve such effect also, there are well known disadvantages to the use of organic solvents. Organic solvents generally, including the lower alkanes of Thompson '778, acetone, alcohols and acetonitrile of Kelsoe '767, and tetrahydrofuran favored in both references, are highly volatile, flammable, and toxic. The preparation and use of organic solvents requires arrangements for ventilation, fire suppression, and preferably solvent recovery. If the solvents are not recovered they constitute emissions that create toxicity issues, may be subject to regulatory restrictions, and constitute greenhouse gases that potentially aggravate the problem of preventing atmospheric warming or other climate effects.

Prior to the present invention, however, it has been considered essential to use non-aqueous solvents, and in particular organic solvents, for halogenated silanes because the halogenated silanes are readily hydrolyzed by contact with water with release of hydrogen halide gas such as HCl. In fact, the trihalosilanes that are used in the formulations and methods of the Thompson and Neal patents react violently when contacted with water. They can readily ignite under these conditions and the resulting conflagration may be difficult to extinguish.

Thus, prior to the present invention, it has been considered necessary to accept the disadvantages of toxicity, flammability, solvent recovery, waste disposal, and expense associated with the use of organic solvents for halosilane, hydroxysilane and alkoxysilane wood treatment formulations.

Processes are known for producing hydrophobic concrete. For example, Johansson et al. U.S. Pat. No. 6,833,091 describes a method for stabilizing gravel, sand, crushed stone, rock and concrete structures which have cracks by injecting a pumpable low viscous aqueous aerated concrete with a pore volume≥20% into the cracks. If hydrophobic aerated concrete is desired, the hydrophobicity can be increased by adding rosin in an amount of 0.1-2.5 parts by weight per 100 parts by weight of cement. The presence of an anionic surfactant comprising aryl disulphonates and/or a colophonium or phenol-modified colophonium resin further contribute to the hydrophobicity of the aerated concrete.

Cuthbert U.S. Pat. No. 5,073,195 describes treatment of wood, masonry, paper, textiles and a variety of other substrates with aqueous solutions comprising combinations of an alkyltrimethoxysilane such as methyltrimethoxysilane or isopropyltrimethoxysilane and a water-soluble coupling agent comprising an aminoalkylsilane such as N-(2-aminoethyl)-3-aminopropyltrimethoxysilane or a quaternary ammonium functional silane. Methyltrimethoxy-silane is listed as a coupling agent but all examples and claims call for an aminoalkylalkoxysilane or quaternary salt. The mole ratio of alkyltrialkoxysilane to coupling agent is between about 0.5:1 and about 3.0:1, preferably 1.5:1 to about 2.0:1 in order to provide stable solutions. Aqueous solutions outside these ranges of ratios are said to form gels. Cuthbert describes only topical treatment of wood or masonry products.

DePasquale et al. U.S. Reissue Pat. 33,759 describes an aqueous emulsion for imparting water repellency to concrete and other porous masonry surfaces. the emulsion may comprise an alkyltrialkoxysilane such as octyltriethoxysilane and an emulsifier comprising a nonionic surfactant. The exemplary formulations comprise octyltriethoxysilane and either a sorbitan fatty acid ester or polyoxyethylene sorbitan fatty acid ester. A lengthy list of alternative silane reagents includes methyltrimethoxysilane, tridimethylaminosilane, octyltrichlorosilane, etc. One example contains octyltriethoxysilane and 0.5 wt. % acetic acid, while another contains octyltriethoxysilane and 1.0 wt. % triethylamine. The surfactants are said to act as inhibitors of hydrolysis in the absence of an acid or alkaline medium but in the acid or alkaline medium of the masonry, e.g., concrete, or the like, hydrolysis is said to occur readily with the desired chemical bonding with the substrate.

Thomas U.S. Pat. No. 5,776,245 describes preparation of a hydrophobic gypsum product in which a hydrophobic additive is dispersed in an aqueous gypsum mixture. The additive comprises a polysiloxane and a silane of the general formula $(RO)_2SiRR'$ or $(RO)_3SiR'$ in which R' is preferably an amino, amino-loweralkylene-amino or dialkylenetriamino group. Various prior art references describing formulations comprising a coupling reagent are discussed in the background of the Thomas '245 patent.

Thomas U.S. Pat. No. 5,855,667 is similar to the Thomas '245 patent but does not require a polysiloxane. As in the '245 patent, a preferred combination is methyltrimethoxysilane and N-(2-aminoethyl)-3-aminopropyltrimethoxysilane. The ratio of the first silane, e.g., methyltrimethoxysilane, to the second silane, i.e., the aminoalkylsilane, is said to range preferably from 1:1 to 9:1, while the exemplified range is from 2.33: to 4:1. The reported results indicate significantly higher water absorption by the gypsum product produced at a 4:1 ratio as compared to 2.33:1. Three comparative examples use methyltrimethoxysilane alone, with relatively high water absorption results. The formulations of Thomas '667 do not include an acid catalyst.

Göbel U.S. Pat. No. 6,139,622 is directed to a process for the production of a homogenously waterproofed concrete (integrally water-proofed concrete) in which an aqueous hydroylzable emulsion containing organosilicon compounds is added before curing to the fresh concrete mix prepared from water. The organosilicon compound can be an alkyltrialkoxysilane, preferably n-octyltriethoxysilane and hexadecyltriethoxysilane. The working examples combine these two alkyltrialkoxysilanes with a silane surfactant. In a preferred embodiment, and in particular also in the case of emulsions containing short-chain silanes, for example containing $C_3$ and $C_4$ alkylene groups, an acidic catalyst is added shortly before use which is capable of breaking the Si—O bonds, but not the Si—C bonds, in the claimed alkoxysilanes, in order to improve the effectiveness of the silanes on neutral, weakly acidic or alkaline, in particular problematic, surfaces.

Japanese published application 2002-013902 describes preparation of silane incorporated paper by adding a silane compound to the pulp slurry. The silane-incorporated paper is composed of an aggregate of vegetable fibers and contains a silane compound in a proportion of ≥2 wt %, preferably 5-20 wt. % with respect to $SiO_2$. The use of an amine coupling agent is preferred. An epoxy coupling agent may also be used. The exemplary disclosure uses a combination of N-(2-aminoethyl)-3-aminopropyl-trimethoxysilane and 2-(3,4-epoxycyclohexyl)ethyltrimethoxysilane. The aqueous medium for the alkoxysilanes contains a significant concentration of isopropanol.

SUMMARY OF THE INVENTION

Among the objects of certain and various embodiments of the invention are the provision of formulations and methods of treatment of articles and materials such as, e.g., wood or wood products, including paper, concrete, drywall, wool fabric or cotton fabric; the provision of methods and formulations that impart water resistance to such articles or materials; the provision of methods and formulations that impart fire resistance to wood or wood products; the provision of methods and formulations that impart insect resistance to wood or wood products; the provision of hydrophobic materials and products such as water-repellent concrete, water-repellent gypsum products, and water-repellent paper; the provision of such materials and products which are hydrophobic throughout; the provision of processes for the manufacture hydrophobic concrete, gypsum products, and paper; the provision of such formulations that do not require hydrocarbon or other organic solvents; the provision of such formulations which do not create fire or explosion risks; the provision of such formulations and methods which do not cause emissions of toxic or flammable vapors; and/or the provision of such formulations and methods that do not contribute greenhouse gases to the atmosphere.

Those skilled in the art will understand that the above listed objects are illustrative and not necessarily relevant or essential to all embodiments of the invention. Nor do these objects necessarily exhaust all purposes to which the invention may be applied or all benefits and advantages which the invention is capable of providing in appropriate circumstances.

Briefly therefore, the present invention is directed to a formulation comprising a silane component and a water-soluble salt component, preferably a formulation comprising an aqueous medium containing a silane component and a water-soluble salt component.

The invention is further directed to a combination useful for treatment of wood and wood products, the combination comprising a silane component and a water-soluble salt component.

In a further aspect, the invention is directed to a method for treating an article or material. The method comprises contacting the article or material with a silane formulation comprising an aqueous medium containing a silane component and a water-soluble salt component.

In another aspect, the invention is directed to treated wood or a treated wood product having a silane composition or silane residue distributed therein in a region extending inwardly from a surface thereof. The treated wood or wood product further comprises at least a detectable presence of salt within said region.

The invention is still further directed to a method for preparation of an aqueous silane formulation. In accordance with the method, a water-soluble salt is introduced into an aqueous medium and allowed to dissolve until the concentration of salt in the medium is at least about 60% of saturation. A silane compound is also introduced into the medium.

In another aspect, the invention is directed to a method for treating an article material comprising contacting the article or material with a silane formulation comprising an aqueous medium containing a silane corresponding to the formula:

Formula II wherein $X^3$ is selected from the group consisting of hydroxy and alkoxy, each of $R^{10}$, $R^{11}$ and $R^{12}$ is independently selected from the group consisting of hydroxy, alkoxy, alkyl and hydrogen, and at least one of $X^3$, $R^{10}$, $R^{11}$ and $R^{12}$ is alkoxy.

The invention is still further directed to a formulation comprising an aqueous medium having dispersed therein between about 0.01 and about 5 wt. % of a silane corresponding to the formula:

Formula II wherein $X^3$ is hydroxy or alkoxy, each of $R^{10}$, $R^{11}$ and $R^{12}$ is independently selected from the group consisting of hydroxy, alkoxy, alkyl and hydrogen, and at least one of $X^3$, $R^{10}$, $R^{11}$ and $R^{12}$ is alkoxy.

The invention is also directed to mixture comprising a boron component and a water-soluble salt component in a weight ratio of the boron-containing component to the salt component between about 0.5:1 and about 5:1.

In yet another aspect, the invention is directed to recreational equipment comprising a wood component having a silane composition or silane residue distributed therein in a region extending inwardly from a surface thereof.

The present invention is further directed to a process for preparing concrete having hydrophobic properties. The process comprises curing and drying a curable wet concrete mix comprising cement, aggregate and an aqueous medium comprising an alkoxysilane.

The invention is further directed to a process for preparing a gypsum product having hydrophobic properties. The process comprises forming a curable wet gypsum mix into a desired configuration, said wet mix comprising gypsum and an aqueous medium comprising an alkoxysilane. The wet gypsum mix is cured and dried in the presence of a catalyst for the reaction of said alkoxysilane with gypsum to produce a hydrophobic gypsum product.

The invention is also directed to a process for the manufacture of hydrophobic paper. The process comprises preparing a pulp comprising a slurry of cellulosic fibers in an aqueous medium comprising an alkoxysilane. The pulp is delivered to a screen for forming a sheet comprising fibers of the pulp. The sheet is compressed and dewatered; and the compressed sheet of fibers is dried to produce a sheet of paper that is resistant to water.

The invention is also directed to a continuous process for the manufacture of hydrophobic paper. The process comprises preparing a pulp comprising a slurry of cellulosic fibers in an aqueous medium comprising an alkoxysilane. The pulp is delivered to a wire for forming a web comprising fibers of the pulp. The fibrous web is compressed and dewatered; and the web of compressed fibers is dried to produce a web of paper that is resistant to water.

The invention is further directed to hydrophobic concrete comprising a silane residue distributed therein.

In a further aspect, the invention is directed to a hydrophobic cured gypsum product comprising a silane residue distributed therein.

In a still further aspect, the invention is directed to a drywall product comprising a panel comprising cured hydrophobic gypsum on a paper backing sheet. The panel comprises a silane residue distributed therein.

The invention is also directed to a drywall product comprising a panel comprising cured gypsum and a hydrophobic paper backing sheet or a hydrophobic facing sheet on a surface the panel. The said hydrophobic paper sheet comprises a silane residue distributed therein.

The invention is further directed to a process for preparing a drywall product that is resistant to moisture, mold and mildew comprising applying a hydrophobic paper sheet to a surface of a panel comprising gypsum. The hydrophobic paper sheet comprises a silane residue distributed therein.

The invention is further directed to a paper product comprising cellulosic fibers having a silane residue bonded thereto. The silane residue is substantially uniformly distributed throughout the paper and is bonded to said fibers through an Si—O— linkage.

Other objects and features will be in part apparent and in part pointed out hereinafter

DESCRIPTION OF THE PREFERRED EMBODIMENTS

The present invention provides novel and advantageous formulations and methods for treatment of wood, paper or other wood products that impart desirable properties thereto. By use of an aqueous rather than an organic solvent medium for the silane component, preparation of the formulation and treatment of wood or wood product may be carried out without emission of organic solvents to the atmosphere, and without requiring the relative elaborate arrangements to provide ventilation, control of emissions and recovery of solvents that are necessary in the use of the prior art silane formulations described above.

Among the favorable properties that may be imparted to the wood or wood products are water-resistance and hydrophobicity. The formulations and methods of the invention are useful in imparting similar properties other articles and materials, including, e.g., concrete, wool fabric and cotton fabric.

In accordance with the present invention, novel formulation techniques been discovered by which halogenated silanes, hydroxysilanes or alkoxysilanes can be formulated in an aqueous medium without causing violent reaction or even premature hydrolysis of the halosilane by contact with water of the medium. More particularly, it has been found that useful and highly advantageous formulations can be prepared by introducing a halosilane into an aqueous medium that contains a high concentration of a water-soluble salt. In various preferred embodiments, the aqueous medium is saturated, or at least nearly saturated with a water-soluble salt. Preferably, the salt has a solubility in water of at least about 10%, more preferably at least about 15% or 20%, most preferably about 20% to about 70% by weight at 25° C. The salt is preferably present as a solute in the aqueous medium at concentration on a salt plus water basis of least 60% of saturation, more preferably at least about 70%, 80%, 90%, or 95% of the saturation concentration in deionized water, at 25° C. Preferably, the salt component is present in the aqueous medium at a concentration of at least about 10 wt. %, more preferably at least about 15 wt. % or at least about 20 wt. %, basis salt plus water.

Optionally, the formulation may also contain a boron component. The inclusion of a boron component comprising a boron compound is particularly useful where it is important to impart fire-retardant or insect resistance properties. However, there are many applications where it is important only to impart properties such as water resistance, in which case the presence or use of a boron compound is unnecessary.

Unsubstituted silanes are gaseous or liquid compounds of tetravalent silicon and hydrogen that are analogous to alkanes. The general formula for the unsubstituted silane is the same as for alkane hydrocarbons, $Si_nH_{2n+2}$, where n is an integer equal to or greater than one. The silane component of the formulations of the formulations of the invention comprises one or more substituted silanes corresponding to the formula $Si_nX_{2n+2}$, where n is an integer equal to or greater than one and X is a substituent such as a hydrocarbyl, hydroxy, alkoxy, halo or other inorganic moiety. More particularly, the silane component comprises one or more halo or alkoxy silane compounds corresponding to Formula I:

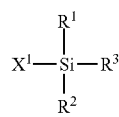

Formula I wherein $X^1$ is selected from the group consisting of halo, hydroxy and alkoxy, each of $R^1$, $R^2$ and $R^3$ is independently selected from the group consisting of halo, hydroxy, alkoxy, alkyl and hydrogen, and at least one of $X^1$, $R^1$, $R^2$ or $R^3$ is halo; or, in an alternative embodiment as described in further detail hereinbelow, at least one of $X^1$, $R^1$, $R^2$ and $R^3$ is alkoxy. Where the silane comprises an alkyl substituent, the alkyl may be straight chain, branched, saturated or unsaturated.

Preferably, the silane component comprises a halosilane, more preferably a trihaloalkyl-or dihaloalkylsilane. Currently, the most preferable halo silane-containing reagent to use is methyltrichlorosilane (chemical formula: $CH_3SiCl_3$). Examples of other silane-containing materials useful in practicing the present invention include, without limitation;

(Chloromethyl)Trichlorosilane;
[3-(Heptafluoroisoproxy)Propyl]Trichlorosilane;
1,6-Bis(Trichlorosilyl)Hexane;
3-Bromopropyltrichlorosilane;
Allylbromodimethylsilane;
Allyltrichlorosilane;
Bromomethylchlorodimethylsilane;
Bromotrimethylsilane;
Chloro(Chloromethyl)Dimethylsilane;
Chlorodiisopropyloctylsilane;
Chlorodiisopropylsilane;
Chlorodimethylethylsilane;
Chlorodimethylphenylsilane;
Chlorodimethylsilane;
Chlorodiphenylmethylsilane;
Chlorotriethylsilane;
Chlorotrimethylsilane;
Dichlorodimethylsilane;
Dichloromethylsilane;
Dichloromethylvinylsilane;
Diphenyldichlorosilane;
Di-t-Butylchlorosilane;
Ethyltrichlorosilane;
Iodotrimethylsilane;
Pentyltrichlorosilane;
Phenyltrichlorosilane:
Trichloro(3,3,3-Trifluoropropyl)silane;
Trichloro(Dichloromethyl)silane; and
Trichlorovinylsilane.
And Alkane-Trialkoxy Silanes such as
Methyltrimethoxysilane and
n-Octyltriethoxysilane As noted, the water-soluble salt preferably has a solubility in water at 25° C. of at least about 10 wt %, more preferably, at least about 15 wt % or 20 wt %, typically, between about 20 wt % and about 70 wt %. Such salts are fully dissociated in the aqueous medium. Although we do not wish to be held to a particular theory, it is believed that the ions of the salt are solvated by water molecules, thus binding the water in a way that reduces its reactivity with the halogens of the silane, allowing a halosilane to be maintained in solution within the aqueous medium without violent reaction with the water, and with little or no hydrolysis. The absence of significant hydrolysis is indicated by the absence of an evolution of hydrogen halide gases or reduction in the pH of the aqueous medium on storage of the formulation prior to use.

It is further understood that the selection of salt cation may be of particular importance since the cation can sequester up to 6 moles of water per mole of cation, thus greatly reducing the potential for reaction with the halosilane. Preferred cations include those that may be selected from among an alkali metal, an alkaline earth metal, a Group III metal, a Group V metal, a transition metal, ammonium, alkylammonium or arylammonium.

Anions also sequester water molecules by which they are solvated, though the cations are understood to have a greater effect. For example, an anion such as chloride sequesters two molecules of water. However, to the extent that the hydrolysis of the halosilane is reversible, the presence of a high concentration of halide ions tends to drive the equilibrium to the left, thus further serving to limit the hydrolysis, an application of Le Chatelier's principle via the Common Ion Effect. Preferred anions may be selected from among halide, nitrate, nitrite, sulfate, phosphate, carbonate, and a carboxylate containing not more than five carbon atoms.

Particularly preferred salts are alkali metal nitrates and nitrites, especially $KNO_3$ and $KNO_2$. Alkali metal halides such as NaCl and KCl are also highly useful, abundant and economical. Other preferred salts include $NaNO_3$, $KNO_3$, $NaNO_2$, $KNO_2$, $Na_3PO_4$, $K_3PO_4$, $NH_4Cl$, and $(NH_4)_2CO_3$. In lieu of or in addition to a mineral or organic acid salt, the salt component may comprise an amino acid zwitterion.

The aqueous silane formulation preferably contains the silane component, i.e., the sum of all silane compounds, more preferably the sum of all halosilane compounds in a proportion between about 0.25% and about 5% by weight, more preferably between about 1% and about 4% by weight, most preferably between about 2% and about 3% by weight. It is particularly preferred that the formulation contain between about 0.25% by weight and about 5% by weight of dihalosilane(s), trihalosilane(s) or combinations thereof. An especially preferred halo silane is methyltrichlorosilane, which is also preferably present in the aforesaid range of weight proportions.

Optionally, the formulation of the invention further includes a boron-containing component comprising a water-soluble boron compound such as boric acid, borax or disodium octaborate (the tetrahydrate of which is sold under the trade designation Timbor® by Nisus Corporation of Rockford, Tenn. Where a boron-containing component is incorporated to impart fire resistance, insect resistance, etc., it is preferably present in the aqueous medium in a proportion between about 1% and about 15%, more preferably between about 5% and about 10%, most preferably between about 7% and about 9%, by weight.

It will be understood that, while the silane formulations of the invention are aqueous, minor proportions of water-miscible organic solvents such as, e.g., tetrahydrofuran or acetone, may be tolerated, and minor proportions water-immiscible organic solvents can also be used, e.g., in emulsion formulations where the formulation contains an additive such as an insecticide that is insoluble in water, or where an insoluble silane such as a trialkoxysilane is used according to the embodiments described hereinbelow. Generally, the silane formulations of the invention comprise at least about 40 wt. % water. Preferably, the water content is at least about 50 wt. %, 55 wt. %, 60 wt. %, or 65 wt. %.

Especially for application to wood or a wood product, the formulation of the invention also preferably includes an insecticide, e.g., chloropyrifos. Most preferred insecticides, including chloropyrifos, are substantially insoluble in water. However, it has been found that particulate solid insecticide like chloropyrifos or chlordane can be readily dispersed in the aqueous medium of the silane formulation. If desired, a surfactant and/or a minor fraction of an organic solvent may be used to produce an emulsion formulation in which the water-insoluble insecticide is dissolved in the organic phase. However, since an insecticide such as chloropyrifos or chlordane can be readily dispersed in the aqueous medium without the assistance of a surfactant or an organic solvent, it is preferred that organic solvents be entirely omitted. A relatively small fraction of insecticide is normally effective for control of termites, carpenter ants and other destructive or otherwise undesirable insects. Ordinarily, the insecticide content need be present in a proportion no greater than about 3 wt. %, preferably no greater than about 2 wt. %, most typically, no more than about 1 wt. %, basis the entire silane formulation.

Further within the contemplation of the invention are combinations of components which can be stored or shipped for subsequent mixing in preparation of the silane formulations of the invention. Such combinations may be provided, e.g., in a co-pack, kit or co-shipment wherein the salt component and the silane component are packaged or delivered separately. For example, both components can be separately packaged or otherwise segregated in the dry state, or a concentrated aqueous solution of the salt can be packaged separately or otherwise segregated from the silane component. Where a boron component is also supplied as part of the co-pack, kit or co-shipment, there are various additional combinations that can be considered, the utility of which can be further understood with respect to the method of preparing he aqueous silane formulation as described hereinbelow. For example, a co-pack, kit or co-shipment can separately comprise:

Combination A: (i) dry salt; (ii) silane
Combination B: (i) concentrated aqueous salt solution; (ii) silane
Combination C: (i) dry salt; (ii) silane; (iii) dry boron component (which may be a solid hydrate)
Combination D: (i) aqueous solution of boron component; (ii) dry salt; (iii) silane
Combination E: (i) concentrated aqueous salt solution; (ii) silane; and (iii) dry boron component;
Combination F: (i) concentrated aqueous salt solution; (ii) silane; (iii) boron solution;
Combination G: (i) silane; (ii) dry premixture of salt and boron component;
Combination H: (i) silane; and (ii) concentrated aqueous solution of salt and boron component;

In such combinations, it may be understood that a "kit" comprises separate components, solutions of components and/or premixtures of components that are contained in separate packages carried by, mounted on or within a common container or support, e.g., separate containers for the components and premixes can be packaged in the same box or secured to the same pallet or skid for shipping. A "co-pack" can include a kit but would further encompass a common package, such as a bag that has a wall or partition within that segregates components and/or premixes. A "co-shipment" encompasses a kit or "co-pack" but further encompasses the delivery to a given formulation site of constituent components and/or premixes: (a) in a common vehicle; (b) according to a common purchase order; (c) in relative proportions corresponding to the proportions that are embodied in the silane formulation of the invention; (d) in relative proportions that are useful in the methods of the invention as further described herein; and/or (e) within a common time frame enabling the components to be used together given the rate of consumption of inventory. In many instances, a co-shipment will be characterized by all of features (a) through (e).

Such combination may preferably comprise between about 3% and about 25% by weight, more preferably between about 5% and about 25% by weight, of said silane component, basis the sum of the salt component and the silane component. The salt component is preferably present in a weight ratio to the silane component between about 2:1 and about 20:1, preferably between about 3:1 and about 10:1. Such combinations may further comprise a boron-containing component which, when present, is preferably present in a proportion between about 5% and about 50% by weight, basis the sum of the silane component, the salt component, and the boron-containing component. These ratios and proportions also preferably prevail in the aqueous silane formulations of the invention, irrespective of whether they are prepared from a co-pack, kit or co-shipment comprising salt and silane component.

Preferred salts, preferred silanes and preferred boron-containing components for the kits, co-packs, co-shipments and premixtures are the same as described above for the aqueous silane formulations of the invention.

Preparation of the aqueous silane formulations of the invention preferable commences with preparation of a concentrated solution of the water-soluble salt, preferably a solution that on a water plus salt basis contains the salt as a solute in a concentration that is at least about 60% of the saturation concentration in deionized water at 25° C., more preferably a solution that on a water plus salt basis contains the salt in a concentration that is at least 70%, 80%, 90%, 95%, or 100% of the saturation concentration in deionized water, or is supersaturated on such basis, at 25° C.

The absolute concentration of the salt is preferably at least 10 wt. %, preferably at least about 15 wt. %, more preferably at least about 20 wt. % on a water plus salt basis. Where the concentration of a highly soluble salt on a water plus salt basis is, substantial, e.g., in excess of about 15 wt. % or 20 wt. %, it has been found that water molecules may be substantially sequestered in solvation of the salt cation(s) even though the absolute concentration of salt is less than 60% of saturation. Where the salt concentration is somewhat higher, e.g., 25%, 30%, 25% or above, it is believed that water molecules may be adequately sequestered even where the concentration is substantially less than 60% of saturation. As those skilled in the art will appreciate, this may be particularly likely with salts of dibasic and polybasic acids. For example, $K_3PO_4$ has a solubility in water in the range of 65 wt. %, but even at a concentration of 15 wt. % or 20 wt. % provides a high molar proportion of potassium ions. Concentrations at a higher percent of saturation provide greater assurance against hydrolysis of a halosilane, but the silane formulations of the invention include those wherein a highly water soluble salt such as $K_3PO_4$, $NaNO_2$ or $NaNO_3$ is present at a substantial concentration, e.g., 25 wt. %, 20 wt. %, or 15 wt. %, that remains far short of 60% of saturation. Typically, the salt component concentration is present on a water plus salt basis in the range between about 15% and about 70% by weight, between about 15% and about 50%, or between about 15% and about 40%, or between about 15% and about 30%, by weight. Most typically, the concentration of the salt component is between about 18 and about 30 wt. % on a water plus salt basis.

To facilitate and expedite dissolution of the salt, the water is preferably heated to a temperature of at least 50° C., more preferably at least about 60°, 70°, 80° or 90° C. prior to introduction of the salt. Most preferably, the water is heated to boiling. After the salt has been introduced, the aqueous mixture is preferably maintained at elevated temperature, e.g., at least 50°, 60°, 70°, 80°, or 90° C. during dissolution of the salt. A maximum and preferred temperature is the boiling temperature of the solution, ordinarily but not limited to the boiling temperature at atmospheric pressure.

After the concentrated salt solution has been prepared, the silane component is added, preferably with agitation, to produce a homogeneous mixture.

Optionally, a boron-containing component may also be included in the silane formulation. To prepare an aqueous silane formulation that contains a boron-containing component, preferably the boron-containing component comprising, e.g., boric acid, boric acid anhydride, or borax, is introduced into water and dissolved therein. Preferably, introduction and dissolution of the boron component is conducted at elevated temperature, e.g., in the manner described above for dissolution of the salt component. The water-soluble salt is preferably introduced after the boron-containing component, and more preferably after the boron-containing component has dissolved. The silane is preferably introduced into the aqueous medium containing both the water-soluble salt and the boron-containing component.

Where the aqueous silane formulation is prepared from any of the co-packs, kits, or co-shipments that include a dry premix of salt and boron component, this premix is first dissolved in water, preferably at elevated temperature and preferably after pre-heating the water, as described above; and the silane component is then added to the aqueous medium.

In use of the aqueous silane formulation for treatment of wood or a wood product, e.g., paper, the wood is contacted with the aqueous medium for a period of time sufficient for silane compounds or a silane residue to migrate into the wood, preferably penetrating to a depth of at least about ⅛", preferably at least about ¼", typically about ¼" to ½" from a surface of the wood that is contacted with the formulation.

Treatment of other articles or materials is conducted in a similar manner. Where the article or material treated is concrete, the silane formulation may typically penetrate a distance of at least about 1/16", preferably at least about ⅛", typically between about ⅛" and about ¼" from an external surface contacted with the formulation. The silane formulation readily penetrates wool fabric or cotton fabric, and in fact these materials are readily saturated with the aqueous formulation during the treatment process. The formulation and method of the invention are especially suitable for treating cotton fabric such as canvas, imparting enhanced properties to cotton fabric products such as boat or ship sails.

Application of the aqueous silane formulation may be by immersion, spraying or other convenient and conventional means of applying liquid treatment solutions to wood, paper, concrete or other articles or materials. For many if not most applications, satisfactory treatment is achieved by applying the aqueous silane formulation at atmospheric pressure. However, penetration of the silane into the wood, concrete or other article or material can be promoted and accelerated by applying the aqueous formulation at a pressure of at least about 20 psig. Generally, it may be advantageous to apply the formulation under pressure of between about 25 psig and about 500 psig.

Where it is desired to incorporate a boron-containing component into the article or material such as wood or wood product, the wood, paper or other wood product may be contacted with a silane formulation containing a boron-containing component, e.g., a formulation having the compositions described hereinabove. Alternatively, the wood or wood product may be contacted with a boron-containing aqueous solution and separately with the aqueous silane formulation of the invention. In the latter case, the aqueous silane formulation generally does not need to include a boron-containing component, but if it does, an additional increment of boron-containing component can penetrate the wood. Preferably, the application of the boron-containing solution is commenced first, and preferably but not necessarily completed before contact with the silane formulation. Since the separate boron-containing does not need to contain a salt component (other than the boron-containing component itself), it is generally preferred to conclude the step of boron treatment before contacting the wood with the silane formulation in order to avoid undue dilution of the latter formulation to a level that might subject the silane to hydrolysis.

Contact with the boron-containing solution is maintained for a time sufficient for the boron-containing component or a boron-containing residue to penetrate into the wood a depth of at least about ⅛" from a surface thereof, preferably a depth of ¼" to ½". As in the case of the silane formulation penetration of the wood or wood product may be promoted and accelerated by application of pressure, preferably in the range from about 15 psig to about 500 psig.

Prior to treatment with the silane formulation, or with either the silane formulation or the boron formulation, the wood, concrete or other article or material may be advantageously exposed to a vacuum in order to open the pores of the wood and draw out moisture. For this purpose a vacuum in the range of about 200 to about 400 mm Hg is preferably applied, typically for a period between about 10 and about 20 minutes. The temperature of the wood is preferably at least about 15° C., typically between about 20° and about 30° C. at the beginning of vacuum treatment.

Treatment of wood according to the method of the invention produces a novel wood product. The treated wood or wood product has a water soluble salt and a silane composition or silane residue distributed therein in a region extending inwardly from a surface thereof, preferably at least about ⅛", more typically between about ¼" and at least about ½", e.g. between about ¼" and about 1", between about ¼" and about 2" or between about ¼" and about 3". In certain applications, for example, treated paper, the region throughout which the silane or silane residue is distributed extends from one surface to the opposite surface, i.e., there is complete penetration of the wood material.

In other applications, e.g., treated lumber or a baseball bat, the thickness of the region throughout which the silane or silane residue is distributed may vary widely. For hydrophobicity, it is often sufficient that the silane or silane residue be distributed throughout a marginal region extending at least about ⅛", more typically between about ¼" and about ½" from a surface at which the silane formulation was applied.

However, in accordance with the invention, is has been discovered that wood products are readily treated to distribute silane or silane residue substantially through the thickness of the product from a surface that has been contacted with the aqueous silane composition to an opposite or otherwise remote surface. In practical application, the aqueous silane formulation is typically applied to a plurality of different surfaces or to essentially the entire surface which envelopes the wood product. In either case, it has been found that silane or silane residue maybe be distributed throughout the entire volume of the wood product, or at least the entire volume of a defined section of the wood product where only such limited section is subjected to treatment. For example, where the outer surface of a baseball bat is contacted with the aqueous silane formulation of the invention, especially if the contact is under modest pressure such as 25 psig, the silane/silane residue penetrates to the centerline of the bat after a reasonably modest period of exposure.

The treated wood, and in particular the region in which the silane is distributed, has cross-linked cellulose chains comprising a silane residue. The cross-linked chains comprise a cross-linked structure that corresponds to Formula III:

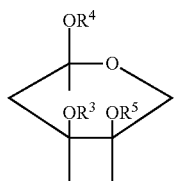

Formula III wherein one of $R^3$, $R^4$ and $R^5$ corresponds to the formula:

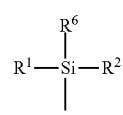

Formula IV wherein $R^6$ corresponds to the formula

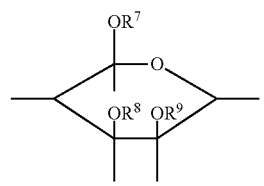

Formula V wherein one of $R^7$, $R^8$ is an oxygen-silicon bond; and
each of the others of $R^3$, $R^4$, $R^5$, $R^7$, $R^8$ and $R^9$ is independently selected from the group consisting of hydrogen and alkyl, and each of $R^1$ and $R^2$ is independently selected from the group consisting of halo, hydroxy, alkoxy, alkyl and hydrogen.

Generally, the region through which the silane formulation penetrates in the treatment process contains a silane compound or silane residue in a concentration between about 0.5% and about 2.0% by weight, and a water-soluble salt content that may vary widely depending on the concentration of salt in the aqueous silane formulation, the nature of the salt and the conditions of treatment. In most applications, it is preferred to wash the surface of the wood with an aqueous wash liquid for removal of salt that has been deposited on the surface during treatment. Because the wash liquid may readily penetrate into the treatment zone adjacent the surface, salt in that marginally region may also be rather readily removed. However, within a treatment zone extending ¼" from the surface of the wood, the average concentration of residual salt may remain at least about 50 ppm, more typically at least about 100 ppm, at least about 200 ppm, at least about 500 ppm, or at least about 1000 ppm even after washing. In a treatment zone extending ½" from the surface of the wood, the wood product of the invention may contain even higher average concentrations of salt. In this deeper treatment zone, the average residual salt content may range from 200 to 50,000 ppm, more typically from 500 to 50,000 ppm, still more typically from 500 to 10,000 ppm, 10,000 to 50,000 ppm, or 1000 to 10,000 ppm.

The products of the invention further encompass treated wood products which are subjected only to a surface wash that does not significantly penetrate the wood, or which are not washed at all. The invention still further encompasses an intermediate product comprising wood or a wood product that has been treated with the aqueous silane formulation of the invention but not yet washed. Products of these latter several types may have a salt content in a treatment zone extending inwardly ¼" from the surface of 200 to 50,000 ppm, 500 to 10,000 ppm, 10,000 to 50,000 ppm, or 1000 to 10,000 ppm, depending on the composition of the aqueous silane formulation, and the temperature, pressure and duration of contact of the wood with the formulation.

The presence of residual salt after treatment of wood according to the method of the invention distinguishes the novel product from wood treated with formulations comprising a halosilane in an organic solvent. The salt can serve as a desiccant that prevents or retards migration of water within the wood structure.

The wood product of the invention is further distinguished from the product of U.S. Pat. No. 7,128,778 by the substantial absence of organic solvent from the treatment zone extending either ¼" or ½" from the wood surface. In product of the invention, organic solvent can be either entirely absent from the treatment zone, or be present at concentrations no greater than 2000 ppm, 1000 ppm, 500 ppm, 200 ppm, 50 ppm, 10 ppm, 500 ppb, 200 ppb, or 100 ppb. The lower the organic solvent content, the less that persons handling the wood product are exposed to toxic chemicals by contact or inhalation.

Where the aqueous silane formulation contains a boron-containing component, or the wood is separately treated with an aqueous boron-containing component, a boron compound or boron compound residue is also distributed throughout the region through which the silane formulation, or the separate boron-containing component as the case may be, has penetrated. Preferably, the boron compound or boron residue content in the treated region is sufficient to provide about 0.01% to about 5% by weight boron in the region.

By proper control of the concentration of silane and silane residue in the marginal region extending inwardly from the surface of a treated wood product, a many fold increase in impact strength can be obtained. For example, if the concentration of silane and silane residue within a ¼" to ½" thick marginal region is limited to a range between about 0.1 to about 2.5 wt. %, a five fold, six fold, eight fold or even ten fold increase in impact strength can be achieved. By controlling the silane content of the marginal region of the wood within an optimal range, it has been found that impact strength of the treated wood product can be increased to at least about 10 newtons as measured by the pendulum test described below. By optimizing the concentration of silane plus silane residue in a marginal region of the wood extending inwardly from a surface to which the aqueous silane formulation has been applied, and impact strengths of greater than about 15 newtons, greater than about 20 newtons, or even greater than about 25 newtons are achievable.

According to the pendulum test, the wood product is mounted so that a treated surface of the wood intercepts the low point in the travel of a pendulum having a rigid arm, a radius of 73.66 cm, and a weighted standard major league baseball mounted at the end. The rigid arm comprises a length of angle iron having a short section of pipe welded to the angle iron at its free end and oriented 90° from the centerline of the arm within the plane of movement of the pendulum. The baseball is force fit into the pipe section with a sufficient portion of the ball extending out from the pipe so that ball can strike the treated surface of the wood object positioned at the bottom of the pendulum arc of travel. A spike is welded to the free end of the angle iron arm (or to a portion of the pipe) and is also oriented 90° from the centerline of the arm but extends in the direction opposite from the pipe. Cylindrical weights having a center opening are placed over the spike to achieve a desired mass of the pendulum bob assembly that strikes the wood object during the test procedure. In an exemplary test, weights are added so that the mass of baseball/pipe section/weight assembly is 2.22 kg. The pendulum is raised to a displacement of 90° from the vertical and allowed to swing by gravity so that the baseball strikes the wood product on the treated surface. The impact under these conditions has been computed to simulate the impact of a 5 ounce baseball striking a wooden bat at a velocity of 135 mph.

The optimal concentration of silane or silane residue in the aforesaid marginal region may vary with the nature of the silane and the nature of the wood. During the treatment process, the rate at which the optimal concentration is approached and realized varies with both the nature of the wood and the temperature of application of the aqueous silane formulation. Thus, the time required to achieve the optimal concentration varies, but can be readily determined by those skilled in the art for any given wood or wood product. Generally, for maple, the optimal concentration of silane plus silane residue in the marginal region is between about 0.5 and about 0.75 wt. %. It has been found that, if the concentration of silane plus silane residue is significantly lower than 0.5 wt. %, any increase in impact strength may not exceed about 5 to 10 newtons by the test described above. On the other hand, if the concentration of silane plus silane residue in the marginal region exceeds about 2.5 wt. %, the wood becomes brittle.

In accordance with the invention, a wide range of wood products of enhanced impact strength can be provided. Particular advantageous are treated recreational products, and especially such products having the impact strength values mentioned above. Examples of just a few of the recreational products of the invention include baseball bats, softball bats, corkball bats, golf clubs, skis, snow boards, surf boards, tennis racquets, racquetball racquets, badminton racquets, ping pong paddles, hockey sticks, lacrosse sticks, cricket bats, and basketball backboards, especially for outdoor courts.

Treatment of a wood or paper product in accordance with the invention imparts a substantial degree of hydrophobicity and serves to seal the wood against penetration by water. Thus, for example, a block of wood or section of lumber that has been contacted with the aqueous silane solution on all its surfaces exhibits a stable bulk specific gravity of not more than about 0.6. Stable bulk specific gravities of less than about 0.5, less than about 0.4, or even less than about 0.25 can be achieved. By stable bulk specific gravity is meant that, where the wood object is immersed in deionized water at 25° C. under restraint for 24 hours (whereby it is fully water logged), the water absorbed during immersion pours out from the interior of the object promptly upon its removal from the water, and when the object has thereafter been allowed to dry in air for 72 hours at room temperature (25° C.), 50% relative humidity, and zero relative air velocity, its bulk specific gravity has not increased by more than about 10% from the value prior to immersion.

Hydrophobicity of a treated surface of the wood may be measured by any other conventional means, e.g., by contact angle of a bead of water applied to a level planar surface of the treated wood. The treated wood product typically exhibits a contact angle of at least about 109°, more typically at least about 115°, most typically between about 124° and about 128° at 25° C.

Further in accordance with the invention, it has been found that various articles and materials, including wood, paper and other wood products and concrete can be treated effectively with an aqueous formulation comprising hydroxy-and alkoxysilanes that are free of halo substituents, irrespective of the concentration of salt in the aqueous medium. In fact, it has been found that effective treatment can be achieved with aqueous formulations containing a hydroxy-or alkoxysilane that is substantially devoid of a water-soluble salt, provided that the formulation is also substantially free of halosilanes. Of course, if the aqueous phase contains a water-soluble salt in sufficiently high concentration, the presence of a halosilane may also be tolerated in any desired concentration, and in some instances may be advantageous.

Some alkoxysilanes, especially those comprising two or three alkyl groups, are highly insoluble in water. Formulations of the invention comprising such alkoxysilanes are essentially oil-in-water emulsions in which the silane is dispersed in the aqueous phase. The alkoxysilanes are readily dispersible under agitation to form stable emulsions. Dispersion may be promoted by addition of a small fraction of an acid, e.g., 3 to 5 drops (0.15 to 0.25 ml) of 12 N HCl per gal. of water. However, if desired a surfactant may be included in the formulation to aid in dispersion of the alkoxysilane and to assist in maintaining the stability of the emulsion. As noted above, a small fraction of organic solvent may also be tolerated in such emulsion formulations, but the presence of even a minor fraction of an organic solvent is not generally necessary, and in most instances is preferably avoided.

In this embodiment of the invention, the wood, wood product concrete, or other article or material is contacted with the aqueous silane formulation, essentially under the conditions described hereinabove, but in the presence of an acid. Advantageously, the wood or wood product can be contacted with a substantially neutral aqueous hydroxy-or alkoxysilane formulation, after which marginal regions into which the formulation has penetrated are exposed to a hydrogen halide gas, preferably HCl. The resultant acidity catalyzes reaction of the silane with cellulose of the wood product. More preferably, the hydroxy-or alkoxysilane formulation contains the acid catalyst, e.g., aqueous HCl, $H_2SO_4$, or $HNO_3$. Alternatively, the liquid acid or acid gas can be delivered separately but simultaneously with or prior to contact with the substantially neutral aqueous hydroxy-or alkoxysilane formulation.

The hydroxy-or alkoxysilane preferably has at least two, more preferably three hydroxy and/or alkoxy substituents, and is preferably free of halo substituents. Preferably, the hydroxy-or alkoxysilane corresponds to Formula VI:

Formula VI wherein each of $X^3$ and $X^4$ is independently selected from the group consisting of halo, hydroxy and alkoxy, and each of $R^{10}$ and $R^{11}$ is independently selected from the group consisting of halo, hydroxy, alkoxy, alkyl and hydrogen. Preferably one of the $R^{10}$ or $R^{11}$ groups is hydroxy or alkoxy, and at least one of $R^{10}$, $R^{11}$, $X^3$ and $X^4$ is alkoxy. As noted, preferably none of $R^{10}$, $R^{11}$, $X^3$ or $X^4$ is halo. Most preferred are alkyltrialkoxysilanes. However, dialkyldialkoxy-, alkylhydroxydialkoxy-, dialkyldihydroxy-, alkylalkoxydihydroxy-, dialkyldihydroxy, and alkyltrihydroxysilanes may also be used.

Where $R^{10}$ and $R^{11}$ are alkyl, and $X^3$ and $X^4$ are alkoxy, each of $R^{10}$ and $R^{11}$ is preferably $C_1$ to $C_4$, more preferably $C_1$ to $C_3$, while each of $X^3$ and $X^4$ is preferably $C_1$ to $C_2$. Still more preferably, each of either $R^{10}$ or $R^{11}$ and both of $X^3$ and $X^4$ are $C_1$ or $C_2$ alkoxy, most preferably $C_1$, and the other of $R^{10}$ or $R^{11}$ is $C_1$ to $C_4$ alkyl, most preferably, $C_1$ to $C_3$.

Particularly preferred hydroxy-and alkoxysilanes include methyltrimethoxysilane, methyltriethoxysilane, ethyltrihydroxysilane, methylhydroxydimethoxysilane, and ethyldihydroxymethoxysilane. Most preferred are trialkoxyalkylsilanes such as trimethoxyethylsilane, trimethoxymethylsilane, triethoxyethylsilane, and triethoxymethylsilane.

Preferably, the aqueous hydroxy-or alkoxysilane formulation contains at least about 0.5 wt. %, more preferably at least about 0.75 wt. % of the silane component. In typical applications, e.g., treatment of paper, the solution contains at least about 0.5 wt. % of the silane component. Generally, the concentration of the silane component falls between about 2 and about 8 wt. %, preferably between about 3 and about 7 wt. %, more preferably between about 4 and about 5 wt. %. Where a surfactant is present, it is preferably present in a concentration between about 5 and about 15 wt. %, more preferably in a concentration between about 8 and about 12 wt. %.

If desired, the aqueous hydroxy-and/or alkoxysilane formulation can contain a boron compound such as boric acid or borax. Where there is a need for a boron compound, the formulation preferably contains at least about 5 wt. %, more preferably at least about 7 wt. %, most preferably at least about 8 wt. % equivalent boron. Generally, the concentration of the boron-containing component is such that the equivalent boron content falls between about 0.001 and about 0.003 wt. %, preferably between about 0.0020 and about 0.0025 wt. %. As noted, the aqueous hydroxy-and/or alkoxysilane formulation contains an acid such as HCl, $H_2SO_4$ or $HNO_3$ which catalyzes reaction of the silane with the wood. Preferably, the acid content of the silane formulation is between about 0.002% and about 0.010%, more preferably between about 0.004% and about 0.0066%, by weight. The pH of the aqueous phase of the formulation is preferably between about 1 and about 6.5.

Because alkoxysilanes react relatively slowly with wood under ambient conditions, treatment with an alkoxysilane formulation is preferably conducted at elevated temperature. More particularly, treatment is preferably conducted at a temperature of at least about 50° C., more preferably between about 70° and about 80° C.

Wood or other material treated with the aqueous hydroxy-and alkoxysilane formulations has generally the same preferred content of silane or silane residue in a marginal region extending generally the same distance from a treated surface of the wood or wood product as in the wood products treated with an aqueous halosilane formulation as described hereinabove. The same hydrophobicity and impact strength properties can also be possessed by the treated product.

Further in accordance with the present invention, processes are provided in which the water-proofing of concrete, gypsum and paper products is integrated with the manufacture of the products. In this respect, the processes of the present invention offer efficiencies as compared to the methods of the prior art in which articles constituted of materials such as concrete, drywall, and paper are first manufactured in finished form, and thereafter treated with water-proofing materials to render them hydrophobic.

Hydrophobic Concrete

Thus, in the process of the invention for preparation of hydrophobic concrete, an aqueous medium comprising a reagent effective for water-proofing is contacted with a concrete premixture comprising a cement and aggregate. The mixture is properly agitated to a substantially uniform dispersion of cement, aggregate, and optionally other additives, and the resulting wet curable concrete mix is thereafter poured or formed into a desired configuration, and allowed to cure and dry. Preferably, the water proofing agent comprises an alkoxysilane. As the cement reacts with water to form a cured matrix for the aggregate, the alkoxysilane simultaneously reacts with the aggregate and the cement, causing a residue of the alkoxysilane to combine with these and any other components of the wet mix which are reactive with the silane, primarily components that comprise labile hydroxyl groups or labile hydrogens. The latter reactions result in formation of a silane residue distributed throughout the concrete product, thereby imparting hydrophobic properties to the product.

The silane residue is the reaction product of the alkoxysilane with the labile hydroxyls, labile hydrogens and/or any other reactive sites on the cement, aggregate, etc. In particular, the alkoxysilane reacts with concrete mix components such as clay, sand, silica, fly ash, rock and cement. While the exact structure of the reaction product may vary with the nature of the composition of the cement, aggregate and other components of the cement mix, as well as with the structure of the particular silane reactant, the silane residue is believed to be bonded to the aggregate, cement, etc. largely through Si—O—Si bonds.

The reaction mechanism is understood to comprise hydrolysis of the alkoxysilane followed by condensation of the hydrolysis product with gypsum or other components of the drywall mix. In a preferred process wherein the silane reagent comprises a trialkoxysilane, e.g., an alkyltrimethoxysilane, the (alkyl)Si(OH)$_3$ hydrolysis product binds to the substrate at labile hydroxyl sites, liberating water and forming a silane residue comprising a trigonal pyramid point group having symmetry elements in a $C_{3V}$ configuration. This structure is understood to contribute to the dimensional stability of the cured concrete.

For the reaction to form the silane residues, it is necessary, or at least preferable, for the alkoxysilane to be activated within the aqueous medium by causing the pH to become either acidic or alkaline. For example, an aqueous alkoxysilane solution can be treated with a few drops of acid, e.g., 12 N HCl, thereby reducing its pH to the range between about 1.5 and about 4, more typically between about 2.5 and about 3.0.

Alternatively, contact of the aqueous medium with the alkaline components of the concrete mix is generally effective to raise the pH of the medium to the range of 11 to 13, sufficient to activate the alkoxysilane and autocatalyze the reaction between the silane and the components of the mix.

The water solubility or miscibility of alkoxysilanes varies with the number and size of hydrocarbon substituents, the presence or absence of hydroxy groups, and the size of the alkyl moieties of the alkoxy groups. For example, methyltrimethoxysilane is readily miscible with water at concentrations of 10%, 15% or 20% whereas n-octyltriethoxysilane is not very miscible at any concentration. Thus, the akoxysilane formulations used in the processes of the invention may be either true solutions or emulsions in which the silane is typically dispersed in the aqueous phase; and the term "formulations" should be understood to encompass both solutions and emulsions. Immiscible alkoxysilanes are readily dispersible under agitation to form stable emulsions. Dispersion may be promoted by addition of a small fraction of an acid, e.g., 3 to 5 drops (0.15 to 0.25 ml) of 12 N HCl per gal. of water. However, if desired a surfactant may be included in the formulation to aid in dispersion of the alkoxysilane and to assist in maintaining the stability of the emulsion. As noted elsewhere herein, a small fraction of organic solvent may also be tolerated in such emulsion formulations, but the presence of even a minor fraction of an organic solvent is not generally necessary, and in most instances is preferably avoided.

In implementing the process of the invention, a curable wet concrete mix is prepared which comprises cement, aggregate and an aqueous medium comprising an alkoxysilane. Preparation of the wet concrete mix comprises mixing an aqueous solution comprising an alkoxysilane with a concrete premixture comprising a cement and aggregate. In preparing the mixture, a dry concrete premixture may be mixed with an aqueous formulation comprising an alkoxysilane. Alternatively, an alkoxysilane can be added to a wet concrete premixture. The relative proportions of aqueous medium and dry-basis concrete premixture are adjusted to that the wet concrete mix is of sufficient fluidity that it can be poured or formed. The water content of the curable wet mix can be adjusted based on known principles to afford the consistency desired for any particular application.

A typical concrete mix may comprise about 16% to about 17% by weight cement, about 42% to about 46% by weight coarse aggregate, about 31% to about 34% by weight fine aggregate, and about 6% to about 8% by weight free water. However, it will be understood that these proportions can be varied significantly depending on the application for which the concrete is produced. Generally, it is preferred that the weight ratio of water to cement in the curable wet mix is in the range between about 0.30 to about 0.50, more preferably in the range between about 0.35 to about 0.45 The water content of the curable mix is preferably between about 25 wt. % and about 65 wt. %, more preferably between about 45 wt. % and about 55 wt. %.

To activate the alkoxysilane for reaction with components of the premixture, the alkoxysilane and premixture are brought together in the presence of a catalyst that activates the alkoxysilane for reaction with the components of the premixture. As noted, either an acid or base can function as the catalyst. A variety of alternative sequences of addition may be used to prepare a curable wet concrete mix containing an activated alkoxysilane. For example, an acid or base and the alkoxysilane may be added to an aqueous medium to provide an aqueous alkoxysilane formulation of other than neutral pH for reaction with components of the premixture. Simultaneously with or promptly after the preparation of the activated aqueous alkoxysilane formulation, the premixture can be brought into contact with the components of the aqueous alkoxysilane formulation. An activated aqueous alkoxysilane solution or dispersion may be added to a dry premixture, thereby providing both water for curing the concrete and activated alkoxysilane for hydrophobic treatment thereof. Alternatively, a wet concrete mix can first be prepared and an activated aqueous silane formulation added to the wet mix. Alkoxysilane can be also be added neat to a wet concrete mix, although addition in an aqueous medium may aid in effective dispersion of the alkoxysilane.

In practice of the process for preparing hydrophobic concrete, the independent addition of an acid or base has been found to be optional. In the presence of the components of the concrete premixture, as discussed above, the aqueous medium automatically adjusts to pH in the range of 11-13 if no acid is added. Thus, in preferred embodiments of the process for preparing hydrophobic concrete, no extraneous source of acid or base is incorporated into the curable mixture comprising the concrete mix components and the alkoxysilane. Reaction of the alkoxysilane with components of the mix is autocatalyzed by the alkaline pH inherently prevailing in the curable wet mix.

If the aqueous alkoxysilane formulation itself is acidic or alkaline, it is preferably mixed with the concrete premixture within a period of not greater than 3 hours, preferably not greater than 2 hours, more preferably not greater than one hour, and most preferably within a period of 30 minutes or 15 minutes after the acid or alkaline formulation is prepared. Where the alkaline properties of the concrete mix itself are relied on to activate the alkoxysilane, i.e., the alkoxysilane formulation itself is substantially neutral, greater latitude is afforded for storage of the aqueous alkoxysilane formulations prior to mixing with the concrete premixture.

After the concrete premixture, water, and alkoxysilane have been brought together, the aqueous medium of the resulting wet concrete mix preferably contains an alkoxysilane component in a proportion between about 0.25 and about 15 wt. %, typically between about 0.50% and about 5 wt. %, preferably between about 2% and about 5 wt. %, but optionally between about 1.0 and about 3 wt. %, or between about 1.5 and about 2.5 wt. %, of an alkoxysilane component. Thus, where a dry premixture is combined with an aqueous alkoxysilane solution, the alkoxysilane component content of the aqueous solution falls generally in the aforesaid ranges. Where alkoxysilane is introduced into a concrete mix that is already wet, the alkoxysilane component concentration of the added alkoxysilane formulation can be higher. However, for aid of dispersion, the alkoxysilane component concentration still preferably falls within the specified ranges.

After a wet curable concrete mix containing the alkoxysilane has been prepared, it is preferably formed into a desired configuration, then allowed to cure and dry. Preferably, curing and drying occurs at an ambient temperature in the range between about 5° and about 40° C., and a relatively humidity between about 35% and about 75%. However, it will be understood that concrete can be successfully poured and cured under more extreme environmental conditions, ranging from just above freezing, i.e. about 5° C. to as high as 110° F.

Preferably, the alkoxysilane component comprises one or more alkoxysilanes corresponding to the formula:

Formula II wherein $X^3$ is hydroxy or alkoxy, and each of $R^{10}$, $R^{11}$ and $R^{12}$ is independently selected from the group consisting of hydroxy, alkoxy, alkyl and hydrogen. Preferably at least one of $R^{10}$, $R^{11}$, $R^{12}$ and $X^3$ is alkoxy. It is further preferred that at least one of the $R^{10}$ or $R^{11}$ groups is hydroxy or alkoxy. Most preferred are alkyltrialkoxysilanes. However, dialkyldialkoxy-, alkylhydroxydialkoxy-, dialkyldihydroxy-, alkylalkoxydihydroxy-, dialkyldihydroxy, and alkyltrihydroxysilanes may also be used.

Although aminoaminoalkyl and other nitrogen-bearing alkoxysilanes can be used in the concrete preparation process of the invention, it is preferred that the silanization reagent predominantly comprise an alkoxy silane corresponding to Formula II above, more particularly that the alkoxysilane comprise an alkyldimethoxy-or alkyltrimethoxysilane, most preferably an alkyltrialkoxysilane, and that the presence of aminoalkyl or epoxyalkyl silanes be minimized or avoided. More particularly, it is preferred that the aqueous medium in which the concrete is cured not contain aminoalkylsilane(s) and/or epoxyalkylsilane(s) in a weight ratio to the sum of alkoxysilane(s) of Formula II greater than about 1:4. More preferably this ratio is not greater than about 1:10, and still more preferably not greater than about 1:20. Most preferably, aminoalkylsilanes and epoxyalkylsilanes are excluded altogether. In accordance with the instant invention, it has been found that alkoxysilanes containing no functional groups other than alkoxy, or alkoxy and hydroxy, are quite effective for binding a silane residue to the components of the concrete mix to yield a concrete product that is moisture resistant, mildew resistant, and mold resistant. Although many of the prior art references include an aminoalkyl or other functionalized alkoxysilane as a coupling agent to assure binding to the substrate, it has been found that, in the concrete preparation process of the invention, the use of such aggressively functionalized reagents is not necessary to achieve water resistance in the cured concrete. By conducting the process using the preferred alkoxysilane formulations, both the cost and the toxicity of the more aggressively functionalized alkylsilanes are avoided.

Particularly preferred hydroxy-and alkoxysilanes include methyltrimethoxysilane, methyltriethoxysilane, n-octyltriethoxysilane, ethyltrihydroxysilane, methylhydroxydimethoxysilane, and ethyldihydroxymethoxysilane. More preferred among these are those that conform to the preferred class of reagents discussed above with respect to Formula VI in which the alkoxy substituents are $C_1$ or $C_2$, most preferably $C_1$, and the alkyl substituent(s) are $C_1$ to $C_4$, most preferably $C_1$ to $C_3$. The low molecular weight silanes dry more quickly and are much more economical than the alkoxysilanes with longer chain alkoxy substituents. Most preferred are trialkoxyalkylsilanes such as trimethoxyethylsilane, trimethoxymethylsilane, triethoxyethylsilane, and triethoxymethylsilane, and mixtures thereof. An especially preferred silanization reagent is methyltrimethoxysilane.

Preferably, the principal alkoxysilane compound(s) of the alkoxysilane component are substantially free of moieties comprising quaternary ammonium ion, quaternary phosphonium ion, pyridinium ion, sulfonate ion, or carboxylate ion. More preferably, the principal alkoxysilane compound(s) are nonionic, and most preferably the entire alkoxysilane component is nonionic. It is further preferred that the aqueous alkoxysilane formulation be substantially free of any functional amount of an alkoxysilane that comprises a quaternary ammonium ion, quaternary phosphonium ion, pyridinium ion, sulfonate ion, or carboxylate ion. Most preferably, the formulation is substantially free of any functional amount of an ionic alkoxysilane.

The cured concrete product preferably contains a silane residue in a proportion between about 0.025 and about 10 wt. %, between about 0.1 and about 5 wt. %, or between about 0.5 and about 3 wt. %. For many applications, a particularly preferred loading is about 2 wt. % The "silane residue" is the silicon-containing moiety that is derived from the alkoxysilane and remains in the cured concrete. The exact structure of the residue may vary with the composition of the alkoxysilane used in the integrated concrete production and treatment process, the composition of the concrete premixture, and the conditions of cure. Thus, the proportions of silane residue as stated above are normalized concentrations based on the equivalent quantity of the alkoxysilane from which the residue derives.

Preferably, the wet curable concrete mix is agitated sufficiently so that the silane residue becomes substantially uniformly distributed throughout the cured concrete product, and the product comprises both a hydrophobic surface and a hydrophobic interior. Most preferably, the product is substantially hydrophobic throughout its interior. Typically, the contact angle of a drop of water on the exterior surface of the concrete product is at least about 109°, more typically at least about 115°, most typically between about 120° and about 128° at 25° C. If the product is fractured to expose an interior surface, a comparable contact angle is exhibited by a drop of water beaded on the exposed surface.

In addition to water-repellency, the concrete products of the invention are also resistant to attack by acids and alkalis.

The process of the invention is applicable to the preparation of prestressed concrete. A curable wet concrete mix is prepared in the manner described above and poured around a tendon that is under tensile stress. After curing has been completed, tension on the tendon is relaxed, and as the tendon contracts longitudinally, it places the cured concrete under compression via the frictional engagement between the cured concrete and the surface of the tendon. The invention is further applicable to the preparation of post-tensioned concrete, which may be prepared in a conventional manner using the wet curable concrete mix prepared according to the process of the invention.

Hydrophobic concrete as prepared according to the process of the invention has innumerable applications. Particularly prominent are applications in which the concrete product is exposed to the elements. For example, hydrophobic concrete prepared in accordance with the process of the invention finds particular application in structures such as roads and bridges, and in marine applications such as piers, wharves, caissons, etc.

Hydrophobic Gypsum Products

The invention is further directed to a process for preparing a gypsum product, e.g., a drywall panel, wall plaster, or a Plaster of Paris casting, that has hydrophobic properties. In implementation of the process, a curable wet gypsum mix comprising an alkoxysilane component is prepared, preferably by mixing gypsum with an alkoxysilane in an aqueous medium that may be alkaline, neutral or acidic. For example, an alkoxysilane and an acid are added to an aqueous medium to prepare an aqueous formulation having a pH preferably below about 6.5, e.g., between about 2 and about 6.5, more preferably between about 4 and about 6, and thereafter the aqueous formulation is promptly mixed with either wet or dry particulate gypsum to produce the wet curable mix. The mix is then formed to the desired configuration and allowed to cure.

Reaction may be accelerated by a pH below 4, but reaction rate can also accelerated by operating at elevated temperature. In any case, reaction can proceed at a satisfactory pace in the 4 to 6 range over a reasonable range of temperature. Alternatively, the reaction can be conducted at an alkaline pH, e.g., 7.5 to 10, or neutral pH, i.e., 6.5 to 7.5, typically at elevated temperature.

The sequence of addition of components is not narrowly critical. Conveniently, the alkoxysilane component is first mixed with water, the acid is added to the mixture, and the resulting aqueous formulation added to dry particulate gypsum. Alternatively, the alkoxysilane can be added to an acidic aqueous medium to produce the formulation that is mixed with the gypsum. In either case, the resulting mixture is agitated to uniformly disperse the gypsum, and the wet mix poured into a mold or otherwise formed, e.g., into a planar configuration of proper thickness for preparation of a drywall panel. The aqueous acidic alkoxysilane formulation is preferably mixed with particulate gypsum within a period of not greater than 3 hours, preferably not greater than 2 hours, more preferably not greater than one hour, and most preferably within a period of 30 minutes or 15 minutes after the acidic aqueous alkoxysilane formulation is prepared. The wet gypsum mix can be formed into the desired configuration within the time periods conventionally required to allow forming while the curable wet mixture exhibits sufficient fluidity for the purpose.

Preferably, the aqueous silane formulation contains between about 0.25 and about 15 wt. %, between about 0.50 and about 10 wt. %, or between about 3 and about 8 wt. %, most preferably between about 3% and about 5 wt. % of an alkoxysilane component. The preferred alkoxysilane corresponds to Formula II as set forth above. Particularly suitable alkoxysilanes are generally the same as those listed above with respect to hydrophobic concrete formulations. More preferably, the principal alkoxysilane component is non-ionic. It is further preferred that the aqueous alkoxysilane formulation be substantially free of any functional amount of an alkoxysilane that comprises a quaternary ammonium ion, quaternary phosphonium ion, pyridinium ion, sulfonate ion, or carboxylate ion. Most preferably, the formulation is substantially free of any functional amount of an ionic alkoxysilane.

Among the alkoxysilane reagents, more preferred are those that conform to the preferred class of reagents discussed above with respect to Formula VI in which the alkoxy substituents are $C_1$ or $C_2$, most preferably $C_1$, and the alkyl substituent(s) are $C_1$ to $C_4$, most preferably $C_1$ to $C_3$. Methyltrimethoxysilane is especially preferred.

As the gypsum reacts with water to form a cured plaster or drywall panel, the alkoxysilane simultaneously reacts with any of various components of the drywall formulation, causing a residue of the alkoxysilane to combine with these components of the wet mix which are reactive with the silane, primarily components that comprise labile hydroxyl groups or labile hydrogens. The latter reactions result in formation of a silane residue distributed throughout the cured gypsum product, thereby imparting hydrophobic properties to the product.

A typical drywall formulation is described in a Material Safety and Data Sheet published by LaFarge of North America and contains gypsum in a proportion of 70% to 90% by weight, $CaCO_3$ and optionally minor proportions (<10 wt. % each) of cellulose, quartz, vermiculite, $K_2SO_4$, starch, mica, fiberglass, paraffin wax, and boric acid (<1 wt. %) preferably, the gypsum component of a drywall formulation comprises $CaSO_4.2H_2O$, $CaSO_4.H_2O$ or $CaSO_4.\frac{1}{2}H_2O$.

The reaction mechanism is understood to comprise hydrolysis of the alkoxysilane followed by condensation of the hydrolysis product with gypsum or other components of the drywall mix. The silane residue is the reaction product of the alkoxysilane with the labile hydroxyls, labile hydrogens and/or any other reactive sites on various drywall components. In particular, the alkoxysilane reacts with components of the mix such as cellulose, quartz, starch, mica, and fiberglass. The exact structure of the reaction product may vary with the nature of the drywall composition, as well as with the structure of the particular silane reactant. In a preferred process wherein the silane reagent comprises a trialkoxysilane, e.g., an alkyltrimethoxysilane, the (alkyl)Si(OH)$_3$ hydrolysis product binds via R—Si—O— linkages to the substrate at labile hydroxyl sites, liberating water and forming a silane residue comprising a trigonal pyramid point group having symmetry elements in a $C_{3V}$ configuration. This structure is understood to contribute to the dimensional stability of the treated gypsum product.

The cured gypsum product contains a silane residue in a proportion between about 0.5 and about 10 wt. %, or between about 1 and about 8 wt. %. Preferably, the principal alkoxysilane(s) of the alkoxysilane component are substantially free of moieties comprising quaternary ammonium ion, quaternary phosphonium ion, pyridinium ion, sulfonate ion, or carboxylate ion. More preferably, the entire alkoxysilane component is free of such moieties; and most preferably, the principal alkoxysilanes and the entire alkoxysilane component are nonionic.

Preferably, the wet curable gypsum mix is agitated sufficiently prior to forming so that the silane residue becomes substantially uniformly distributed throughout the cured gypsum product, and the product comprises both a hydrophobic surface and a hydrophobic interior. Most preferably, the product is substantially hydrophobic throughout its interior. Typically, the contact angle of a drop of water on the exterior surface of the gypsum product is at least about 109°, more typically at least about 115°, most typically between about 120° and about 128° at 25° C. If the product is fractured to expose an interior surface, a comparable contact angle is exhibited by a drop of water beaded on the exposed surface.

In addition to water-repellency, the gypsum products of the invention are also resistant to attack by acids and alkalis.

In preferred embodiments, the wet gypsum mix is formed into a panel suitable for drywall. For example, the wet mix may be formed onto a paper backing sheet. In the manufacture of drywall, the wet gypsum mix may be pressed between two paper sheets, i.e., a backing and a facing sheet to form a wet assembly. Thereafter, the wet assembly is dried and the wet gypsum mix cured to yield a drywall product comprising a hydrophobic panel comprising cured gypsum. The paper backing and facing sheets absorb the aqueous alkoxysilane solution so that, after drying and curing, both the cured gypsum panel and the paper sheet(s) are hydrophobic.

Where the wet gypsum mix is formed on a paper backing, the alkoxysilane molecules react with both the gypsum and the paper. This forms silane linkages bound to both the paper and the gypsum, thereby enhancing the adhesion of the paper to the panel.

The treated drywall product is resistant to mold or mildew, and will not burn or support combustion. The dimensional stability of the treated product is greatly enhanced and the paper covering the gypsum drywall product will resist absorption of water, swelling, or separation from the gypsum drywall sheet, even if the exterior surface of the backing or facing paper is maintained in contact with water for an extended period of time.

In the alkoxysilane treatment process, the dry gypsum is preferably combined with a wetting agent, optionally an acid or base, and the alkoxysilane in an aqueous medium. Production and treatment of a gypsum drywall are completed in a single treatment step, followed by removal of the drywall from the aqueous medium and drying under conventional conditions. The alkoxysilane treatment process accomplishes the desired properties of the treated drywall using reagents that are much safer than halosilanes. As a consequence, the process is safer as well. Because the liquid medium for the alkoxysilanes is water, a further element of process safety is provided by comparison with the conventional halosilane process which requires organic solvents.

As noted, alkyltrialkoxy silane ("ATAS") reagents are particularly preferred. A non-exhaustive list of candidate reagents is as follows:

3-glycidoxypropylmethyldiethoxysilane
3-octanoylthio-1-propylmethoxysilane
bis-(δ-Trimethoxysilylpropyl)amine
Hexadecyltrimethoxysilane
Methyltriethoxysilane
N-Ethyl-3-trimethoxysilyl-methylpropamine
N-Phenyl-δ-aminopropyltrimethoxysilane
N-β-(Aminoethyl)-δ-aminopropylmethyldimethoxysilane
N-β-(Aminoethyl)-δ-aminopropyltrimethoxysilane
Octyltriethoxysilane
Propyltriethoxysilane
tris-[3-(Trimethoxysilyl)propyl)isocyanurate
Vinylmethyldimethoxysilane
Vinyltriethoxysilane
Vinyl-tris-(2-methoxyethoxy) silane
β-(3,4-Epoxycyclohexyl)ethyltriethoxysilane
β-(3,4-Epoxycyclohexyl)ethyltrimethoxysilane
δ-Aminopropylsilsesquioxane
δ-Aminopropyltriethoxysilane
δ-Aminopropyltrimethoxysilane
δ-Glycidoxypropyltrimethoxysilane
δ-Glycidoxypropyltriethoxysilane
δ-Isocyanatopropyltrimethoxysilane
δ-Isocyanatopropyltriethoxysilane
δ-mercaptopropyltriethoxysilane
δ-mercaptopropyltrimethoxysilane
δ-Methacryloxypropyltrimethoxysilane
δ-Ureidopropyltrialkoxysilane
δ-Ureidopropyltrimethoxysilane As noted, mono-and dialkoxysilanes may also be used, but the trimethoxy silanes combine with the substrate to provide an especially stable trigonal pyramid structure that imparts a high degree of dimensional stability to the product.

Although aminoaminoalkyl and other nitrogen-bearing alkoxysilanes can be used in the drywall manufacturing process of the invention, it is preferred that the silanization reagent predominantly comprise an alkoxy silane corresponding to Formula II above, more particularly that the alkoxysilane comprise an alkyldialkoxy-or alkyltrialkoxysilane, most preferably an alkyltrialkoxysilane, and that the presence of aminoalkyl or epoxyalkyl silanes be minimized or avoided. More particularly, it is preferred that the aqueous medium in which the gypsum is treated not contain aminoalkylsilane(s) and/or epoxyalkylsilane(s) in a weight ratio to the sum of alkoxysilane(s) of Formula II greater than about 1:4. More preferably this ratio is not greater than about 1:10, and still more preferably not greater than about 1:20. Most preferably, aminoalkylsilanes and epoxyalkylsilanes are excluded altogether. In accordance with the instant invention, it has been found that alkoxysilanes containing no functional groups other than alkoxy, or alkoxy and hydroxy, are quite effective for binding a silane residue to the components of the gypsum mix to yield a drywall product that is moisture resistant, mildew resistant, and mold resistant. Although many of the prior art references include an aminoalkyl or other functionalized alkoxysilane as a coupling agent to assure binding to the substrate, it has been found that, in the gypsum treatment process of the invention, the use of such aggressively functionalized reagents is not necessary to achieve water resistance, to prevent swelling, to impart strength and dimensional stability, or to resist mold and mildew. By conducting the process using the preferred alkoxysilane formulations, both the cost and the toxicity of the more aggressively functionalized alkylsilanes are avoided. An especially preferred silanization reagent is methyltrimethoxysilane.

A by-product of the silanization reaction is an aqueous alcohol or aqueous mixture of alcohols corresponding to the alkoxy group(s) on the silane reagent. Where the alkoxy group(s) comprise a lower alkyl component such as methyl, ethyl, propyl, or butyl, and especially where they comprise methyl, the by-product alcohol is readily recovered from the reaction mixture and reclaimed for other applications. As the alkoxysilane reacts with gypsum and/or other components of the gypsum mix, a spent aqueous phase remains comprising by-product alcohol derived from an alkoxy group of the alkoxysilane. This aqueous phase is removed in the drying process, and the by-product alcohol can be recovered incident to drying. In the course of drying, an effluent vapor stream is formed which comprises water vapor and the by-product alcohol. Fractionation of the vapor stream allows the alcohol to be recovered. In the particularly preferred embodiment where a methoxysilane, most preferably a trimethoxysilane, is used for treatment, recovery of the methanol by-product is facilitated by the advantageous difference in volatility between methanol and water. Methanol has an atmospheric boiling point of 148.4° F., and no azeotrope is formed. As a consequence, water can be removed from the vapor stream in a partial condenser and methanol in the vent stream from the partial condenser can be recovered as a secondary condensate either neat or at minimal moisture content, with little or no requirement for rectification. To maximize methanol recovery and control emissions, a chilled coolant is preferably used in the secondary methanol condenser. Noncondensables can be substantially excluded by drying in a closed system, e.g., under vacuum.

Recovered methanol can be used or sold as a secondary product for various applications, e.g., to "whiten" paper pulp.

Further in accordance with the invention, it has been discovered that effective protection of drywall against moisture damage, mold and mildew can be accomplished by treatment of only the paper backing and facing sheets of the drywall composite. Thus, a hydrophobic mold-and mildew-resistant drywall can be prepared by first treating the backing paper that is applied to both sides of the gypsum panel. After drying, the treated paper is applied to the panel and has been found to adhere strongly and securely to the gypsum board. The resultant drywall product has been demonstrated to be dimensionally stable and to possess highly satisfactory moisture-, mold-and mildew-resistance even where the gypsum panel itself has not been treated with a silane or otherwise to impart hydrophobic properties.

It has further been found that either conventional drywall paper or simple copy paper can be treated and used to impart the desired properties to the drywall composite, with or without silane treatment of the gypsum panel, and in the latter case even though the gypsum panel itself is not hydrophobic and readily absorbs water when not protected by the hydrophobic paper. According to this alternative, dimensionally stable and moisture resistant drywall can be produced at an especially economical cost.

Generally, the drywall product of the invention comprises a panel comprising cured gypsum and a hydrophobic paper backing sheet or a hydrophobic facing sheet on a surface of the panel. As described above, the hydrophobic paper sheet comprising a silane residue distributed therein.

Surprisingly, it has been discovered that a drywall product having a hydrophobic paper facing sheet and/or a hydrophobic paper backing sheet comprising a silane residue is resistant to moisture, mildew and mold even where the gypsum panel itself is not hydrophobic. More particularly, where a hydrophobic backing sheet or facing sheet comprises a silane residue as applied in accordance with the invention, the underlying gypsum panel is protected from moisture, mildew and mold even though the panel itself is capable of absorbing water absent the barrier effect of the hydrophobic paper sheet. In most applications, it is preferred that the panel have both a hydrophobic backing sheet and a hydrophobic facing sheet, although there may be applications where the moisture exposure is only on one face of the panel. In this case, a hydrophobic paper sheet only on that side may be sufficient to protect the composite product.

It has further been discovered that preparation or impregnation of the paper with an alkoxysilane introduces a silane residue which imparts not only moisture resistance but enhances both stiffness and strength. The favorable effect on stiffness and strength is sufficient to allow relatively thin backing and facing paper to be used, and to obviate the need for incorporating "dry strength additives" into the paper. Minimizing or avoiding the addition of dry strength additives further contributes to the resistance to microorganisms, especially mycotic organisms such as those which may otherwise cause mildew or mold formation in or on the paper.

Typically, backing paper for drywall contains a dry strength additive comprising both a starch and an oil, e.g., an oil comprising alkenyl succinic anhydride, in order to impart sufficient strength, stiffness and puncture resistance to the paper sheet. For example, drywall backing and facing paper may typically contain about 3.5 lbs. of a mixture of starch and oil per ton of paper, of which approximately 2.5 to 3 lbs. per ton is starch. While these conventional additives are effective in imparting the desired mechanical properties to the paper sheet, they serve as nutrients for microorganisms, and especially for mycotic organisms such as mold and mildew. Thus, conventional drywall containing these additives may have sufficient initial strength but is prone to disfigurement and deterioration resulting from growth of mildew and mold.

In accordance with the invention, treatment of the paper backing and facing sheet stock with an alkoxysilane allows the conventional dry strength additives to be greatly minimized or entirely eliminated. More particularly, the backing sheet and facing sheet each preferably contain no more than about 2.0 lbs., more preferably no more than about 1.5 lbs., carbohydrate additive per ton of paper. Most preferably, the carbohydrate additive content is as low as possible, e.g., no more than 1.0, 0.5 or even 0.2 lbs. per ton. Where otherwise satisfactory paper entirely devoid of carbohydrate is available, it is most preferred. It is further preferred that neither the backing sheet nor the facing sheet contains a stiffener, other than the residue of an alkoxysilane, in a concentration greater than about 2.0 lbs. stiffener per ton. More preferably, the sheet contains no greater than about 1.5, 1.0, 0.5 or 0.2 lbs. per ton of a stiffener other than the silane residue.

It is also preferred that neither the backing sheet nor the facing sheet contains a carbohydrate and an oil in a combined concentration greater than about 3.0 lbs. (carbohydrate plus oil) per ton. More preferably the combined concentration of these additives is no greater than about 2.5, 2.0, 1.5, 1.0, 0.7 or 0.3 lbs. per ton. In addition, it is preferred that neither the backing sheet nor the facing sheet contains nutrients for a mycotic organism in a concentration greater than about 0.7 lbs. per ton. More preferably, the nutrient content is not greater than about 0.3 lbs. per ton. Most preferably, the paper sheet is substantially entirely devoid of starch, other added carbohydrates, added oils, or other nutrients for microorganisms such as mycotic organisms.

The strength imparted by treatment with an alkoxysilane is so substantial that the thickness of the backing and facing sheets can be reduced as compared to the thickness of sheets that are conventional provided in drywall composites. While a conventional facing paper has a thickness of typically 0.025" or more, the facing and backing sheets used in the drywall product of the invention may have a thickness of only ⅜" or even ¼".

Thus, the drywall product of the invention can comprise backing and facing sheets prepared from ordinary copy paper. The product will not burn or support combustion. It has been found that treatment of ordinary copy paper with an alkoxysilane reagent in accordance with the invention imparts dimensional stability, swelling resistance, tensile strength, impact strength, puncture resistance, moisture resistance and resistance to mycotic activity sufficient to meet commercial and residential drywall performance requirements. The product is also insect resistant and the paper backing and facing sheets do not require sizing to prepare them for printing.

Hydrophobic Paper Manufacturing

Further in accordance with the invention, it has been discovered that water-resistant paper can be produced by a process wherein an alkoxysilane is incorporated into the pulp from which the paper is produced. Moreover, it has been found that the incorporation of alkoxysilane as a hydrophobic agent does not adversely affect the strength of the paper that is produced. In fact, there is evidence that paper manufactured according to the preferred embodiments of the process of the invention actually exhibits enhanced strength as compared to paper produced under otherwise identical conditions using otherwise identical pulp composition except for the absence of an alkoxysilane. For example, the tensile strength of a sheet of paper can be evaluated by suspending it between spaced supports and placing weights on it until the cumulative weight is sufficient for the paper to rupture. In such tests, the finished paper produced by the process of the invention has exhibited greater tensile strength than paper of identical thickness as produced from an otherwise identical pulp under otherwise identical conditions, but with an alkoxysilane component omitted from the pulp.

In implementation of the process of the invention for the manufacture of paper, a pulp is prepared comprising a slurry of cellulosic fibers in an aqueous medium comprising an alkoxysilane and preferably a catalyst for the reaction of the alkoxysilane with the fibers. The catalyst may be either a mineral acid, e.g., hydrochloric or sulfuric, or a base, e.g., NaOH, KOH, or $Na_2CO_3$. Where the pulp is acidic, the pH is preferably not greater than about 4; where it is alkaline, the pH is preferably at least about 10.

The pulp is delivered to a screen for forming a sheet comprising fibers of the pulp. The fiber sheet is compressed for dewatering, and dried to produce a sheet of paper that may be calendered to produce a finished hydrophobic paper product. In typical commercial processes, the sheet is initially dewatered by applying a vacuum on the side of the screen opposite the mat of fibers initially deposited, and thereafter further compressed by application of force, as by a platen or compression roll, that presses the sheet against the screen. It will be understood that both the application of reduced pressure on the side of the screen opposite the sheet of fibers and the application of force from a platen or roll have the effect of compressing the sheet.

Preferably, the aqueous silane formulation contains between about 0.25 and about 15 wt. %, more preferably between about 0.50 and about 10 wt. %, or between about 1.5 and about 8 wt. %, most preferably between about 3% and about 5 wt. % of an alkoxysilane component. The preferred alkoxysilane corresponds to Formula II as set forth above. Particularly suitable alkoxysilanes are generally the same as those listed above with respect to hydrophobic concrete and hydrophobic gypsum formulations. Particular alkoxysilanes that have been demonstrated to be effective in imparting hydrophobic properties to paper are methyltrimethoxysilane and n-octyl-triethoxysilane. These may be used individually or in combination. For example, the aqueous medium may contain an alkoxysilane component in a proportion between about 2% to about 5% by weight, and the alkoxysilane component may consist essentially of a mixture of methyltrimethoxysilane and n-octyltriethoxysilane wherein the weight ratio of methyltrimethoxysilane to n-octyltriethoxysilane is between about 4:1 and about 1:4.

In many applications, it has been found that incorporation of methyltrimethoxysilane in the pulp provides a stronger paper product than n-octyltriethoxysilane, although the n-octyltriethoxysilane contributes a higher degree of hydrophobicity. Without being held to a particular theory, it is believed that this may be attributable to the +I, induction effect, as influenced by the lower molecular weight and stronger nucleophilic character of the leaving group, i.e., methanol vs. ethanol. However, the pattern is not entirely consistent. In some cases, the more oleophilic silane has actually provided superior strength. Moreover, at least in the case of methyltrimethoxysilane and n-octyltriethoxysilane, a synergistic effect has been observed from use of a combination of the two alkoxysilanes. Thus, for example: where the pulp is prepared in an aqueous medium comprising 2 wt. % methyltri-methoxysilane, a 16% improvement in tensile strength has been achieved by comparison with a paper product produced under identical conditions from a pulp having an otherwise identical composition, but free of alkoxysilane, where the pulp is prepared in an aqueous medium comprising 2 wt. % n-octyltriethoxysilane, the improvement is 28%, but where the pulp is prepared in an aqueous medium comprising 1 wt. % methyltrimethoxysilane and 1 wt. % n-octyltriethoxysilane, the improvement is 42%.

Although aminoalkyl-and other nitrogen-bearing alkoxysilanes can be used in the papermaking process of the invention, it is preferred that the silanization reagent predominantly comprise an alkoxysilane corresponding to Formula II above, more particularly that the alkoxysilane comprise an alkyldialkoxy-or alkyltrialkoxysilane, most preferably an alkyltrialkoxysilane, and that the presence of aminoalkyl or epoxyalkyl silanes be minimized or avoided. More particularly, it is preferred that the aqueous phase of the pulp not contain aminoalkylsilane(s) and/or epoxyalkylsilane(s) in a weight ratio to the sum of alkoxysilane(s) of Formula II greater than about 1:4. More preferably this ratio is not greater than about 1:10, and still more preferably not greater than about 1:20. Most preferably, aminoalkylsilanes and epoxyalkylsilanes are excluded altogether. In accordance with the instant invention, it has been found that alkoxysilanes containing no functional groups other than alkoxy, or alkoxy and hydroxy, are quite effective for binding a silane residue to the cellulosic fibers, yielding a paper product that is moisture resistant, mildew resistant, and mold resistant. Although many of the prior art references include an aminoalkyl or other functionalized alkyl substituent of an alkylalkoxysilane as a coupling agent to assure binding to the substrate, it has been found that, in the papermaking process of the invention, the use of such aggressively functionalized reagents is not necessary to achieve water resistance, to prevent swelling, to impart strength and dimensional stability, or to resist mold and mildew. By conducting the process using the preferred alkoxysilane formulations, both the cost and the toxicity of the more aggressively functionalized alkylsilanes are avoided. An especially preferred silanization reagent is methyltrimethoxysilane.

Preferably, the principal alkoxysilane(s) of the alkoxysilane component are nonionic. It is further preferred that the aqueous alkoxysilane formulation be substantially free of any functional amount of an alkoxysilane that comprises a quaternary ammonium ion, quaternary phosphonium ion, pyridinium ion, sulfonate ion, or carboxylate ion. Most preferably, the formulation is substantially free of any functional amount of an ionic alkoxysilane.

In preparation of pulp wherein the aqueous medium comprises an alkoxysilane, the sequence of addition is not narrowly critical. For example, an acid or base and an alkoxysilane may be added to an aqueous medium to provide an activated aqueous alkoxysilane formulation of other than neutral pH for treatment of the fibers. Simultaneously with or promptly after preparation of the activated aqueous formulation, cellulosic fibers are mixed with the formulation. Preferably, the alkoxysilane formulation of other than neutral pH is combined with the cellulosic fibers within a period of not greater than 3 hours, preferably not greater than 2 hours, more preferably not greater than one hour, and most preferably within a period of 30 minutes or 15 minutes, after the acid or base is mixed with alkoxysilane to provide the activated silane formulation.

Alternatively, the process can also be carried out with this sequence reversed, i.e., the pulp can be prepared first by adding cellulosic fibers to water, after which the alkoxysilane and acid or base are added to the pulp. In either case, alkoxysilane and acid or base can be added to the aqueous medium in either order or simultaneously to the medium, and in either case the pulp comprising alkoxysilane in a medium having a pH other than neutral is preferably used as soon as practicable after its preparation to provide a sheet of fibers on a screen, followed by compression and drying.

In particularly preferred embodiments of the invention, the pulp is continuously delivered to a moving screen comprising to an endless web ("wire") supported on and driven by cylindrical rolls. A prevalent example is a Fourdrinier machine in which the pulp is delivered from a headbox to the wire. A cellulosic fiber web is formed on the wire which passes over suction boxes for dewatering of the web, then over a couch roll followed by press rolls where further dewatering is accomplished. From the press rolls, the web is drawn over drier drums, optionally over coating rolls for application of a desired finish coating, and finally through calendering rolls where the web is subjected to high pressure and burnishing. The finished paper may be taken up as a roll or may be passed through a shear line where it is divided into sheets that may be stacked and packaged.

The alkoxysilane, preferably an ATAS, may be introduced directly to the headbox, but is preferably uniformly distributed in the aqueous medium as delivered to the headbox. Typical residence time in the headbox is 15 to 20 minutes, more than sufficient for the silanization reaction to proceed to a degree fully adequate to protect the paper product. The pulp delivered from the headbox of Fourdrinier or other papermaking machine can be prepared either from raw fibers or from a crude paper product that is disintegrated in the presence of an aqueous alkoxysilane formulation to yield a reconstituted pulp.

In a further alternative embodiment of the process for manufacture of paper, a crude paper product is initially prepared from a pilot pulp, typically a pulp of conventional composition, i.e., a pulp that is ordinarily devoid of any functional proportion of a silane. In a conventional manner, the pilot pulp is delivered to a screen to produce a pilot fibrous sheet comprising fibers of the pilot pulp. Thereafter, the pilot sheet is dewatered, and compressed to form the crude paper. The crude paper is then disintegrated in the presence of an acidic or alkaline alkoxysilane solution to produce a reconstituted repulp formulation that is delivered to a screen and reformed into a sheet. Preferably, a mixture of crude paper and aqueous silane formulation is agitated with intensity sufficient to comminute the crude paper sufficiently to reduce it to slurried fibers.

The reformed (reconstituted) sheet is then compressed, dewatered, dried, and calendered in accordance with conventional papermaking. Preferably, the crude paper is added to the solution within the time periods specified above following preparation of the alkoxysilane formulation of other than neutral pH, regardless of whether the latter formulation is prepared by addition of alkoxysilane to an acidic or alkaline medium or by addition of acid or base to a neutral aqueous alkoxysilane formulation.

Operation of the process of the invention may take advantage of the fact that sodium hydroxide solutions are used for separation of cellulose from lignin, and are therefore readily available on site in a papermaking manufacturing facility. Thus, it may be advantageous to activate the pulp by addition of alkali rather than importing an additional reagent such as HCl for the purpose. Experiments have demonstrated that NaOH activation is effective over a wide spectrum of caustic strength in combination with a wide range of alkoxysilane concentrations. For example, strong hydrophobic characteristics have demonstrated for paper produced from pulp in which the aqueous medium comprised either 1.0 M NaOH containing 10 wt. % methyltrimethoxy-silane, 0.10 M NaOH containing 1 wt. % methyltrimethoxy-silane, or 0.01 M NaOH containing 0.1 wt. % methyltri-methoxysilane. Where an alkaline medium is used, the pH is preferably between about 7.5 and about 10. Where an acid is used to catalyze the reaction, the pH is preferably between about 2 and about 6.5.

Although the presence of an acidic or alkaline catalyst effectively promotes reaction of the alkoxysilane with the fibers of the pulp, still further embodiments of the invention have been discovered wherein the pulp used in the final papermaking operation is substantially neutral, and reaction of the fibers with the alkoxysilane is activated by heat energy in the drying, and especially in the calendering steps, of the papermaking process. In these embodiments, the pulp comprises an aqueous medium to which no acid or base has been added, and which is therefore substantially neutral, i.e., having a pH greater than about 5 and less than about 9, more typically greater than about 5.5 and less than about 8.5, most typically between about 6.5 and about 7.5. In those embodiments wherein the final papermaking operation comprises disintegration of crude paper that has been produced from a pilot pulp, either or both the pilot pulp and the reconstituted pulp may be free of added acid or base, and in any event may exhibit a pH in the range of about 5 to about 9, or more typically about 5.5 to about 8.5, or about 6.5 to about 7.5.

Comparable to the mechanism prevailing in the treatment of gypsum, the reaction mechanism is understood to comprise hydrolysis of the alkoxysilane followed by condensation of the hydrolysis product with the cellulosic fibers of the paper. An especially stable bond to the fibers is established where the alkoxysilane reagent comprises an ATAS.

In each and all of the various embodiments of the papermaking process, the pulp is preferably agitated sufficiently so that the silane residue become substantially uniformly distributed throughout the finished paper, which therefore comprises both a hydrophobic surface and a hydrophobic interior. Most preferably, the finished paper is substantially hydrophobic throughout its interior. Typically, the contact angle of a drop of water on the surface of the paper is at least about 109°, more typically at least about 115°, most typically between about 120° and about 128° at 25° C.

The paper products provided by the process of the invention include cardboard products as well. Whether paper or cardboard, the finished product contains a silane residue in a proportion between about 0.5 and about 10 wt. %, or between about 1 and about 8 wt. %. Preferably, the principal alkoxysilanes of the alkoxysilane component are substantially free of moieties comprising quaternary ammonium ion, quaternary phosphonium ion, pyridinium ion, sulfonate ion, or carboxylate ion. Preferably, the principal alkoxysilanes are nonionic and the alkoxysilane component is substantially free of alkoxysilanes that comprise quaternary ammonium, quaternary phosphonium, pyridinium, sulfonate ion or carboxylate ion. Most preferably the alkoxysilane component is nonionic.

Among the alkoxysilane reagents, more preferred are those that conform to the preferred class of reagents discussed above with respect to Formula VI in which the alkoxy substituents are $C_1$ or $C_2$, most preferably $C_1$, and the alkyl substituent(s) are $C_1$ to $C_4$, most preferably $C_1$ to $C_3$. Methyltrimethoxysilane is especially preferred. The low molecular weight silanes dry more quickly and are much more economical than the alkoxysilanes with longer chain alkoxy substituents. They are also much more economical than the aminoalkylalkoxysilanes and epoxyalkylalkoxysilanes used in prior art papermaking processes.

The paper product that may be obtained from either the batch or continuous papermaking process of the invention is strongly hydrophobic and will not burn or sustain combustion. The paper product is also strong, and dimensionally stable. More particularly, the paper will not absorb water or swell. Not only the dimensional stability but the strength may be substantially enhanced where the paper is prepared in accordance with the process of the invention.

Preferably, the silane residues comprised by the paper product of the invention are bonded to the cellulosic fibers predominantly through Si—O bonds. Additionally, the paper product is preferably substantially free of amine, imine, amide, or imide linkages between the silane residue and the cellulosic fibers of the paper product.

Particular hydrophobic products of the invention include cardboard pans that can replace styrofoam or wax treated cardboard pans for packaging of meat products, and corrugated cardboard that can replace wax treated corrugated cardboard.

The alkoxysilane treatment process imparts the desired properties of the treated paper using reagents that are much safer than halosilanes which are vigorously reactive with water yielding a hydrochloric or hydrobomic acid by product that is toxic and corrosive. As a consequence, the process of the invention is safer, and can be conducted using standard materials of construction for papermaking equipment without introducing the added maintenance and corrosion problems that attend the use of halosilanes. Because the liquid medium for the alkoxysilanes is water, a further element of process safety is provided by comparison with the conventional halosilane process which requires organic solvents that create a serious fire and explosion hazard, especially in the presence of the power driven machinery used in a continuous papermaking operation.

A major processing advantage is also achieved since preparation and treatment of the paper may be accomplished in a single step. By comparison, a halosilane treatment process conducted on finished paper involves complications as well as hazards that are avoided by the integrated papermaking process of the invention. For example, where paper is treated by an entity different from the paper manufacturer, e.g., by a converter or independent treatment company, the paper as received from the paper manufacturer must be unrolled, treated, dried and re-rolled. All these complications are avoided by the integrated process of the invention.

As in the case of the treatment of gypsum, a by-product of the silanization reaction is an aqueous alcohol or aqueous mixture of alcohols corresponding to the alkoxy group(s) on the silane reagent. Where the alkoxy group(s) comprise a lower alkyl component such as methyl, ethyl, propyl or butyl, and especially where they comprise methyl, the by-product alcohol is readily recovered from the aqueous pulping medium and reclaimed for other applications.

After the aqueous alcoholic medium is expressed from the pulp on the screen or wire, it may be distilled to separate the alcohol from the water. In the particularly preferred embodiment where a methoxysilane, most preferably a trimethoxysilane is used for treatment, the methanol by-product may be readily distilled from the aqueous medium. Because methanol has an atmospheric boiling point of 148.4° F., a sharp separation is readily achieved. Methanol recovery is achieved in substantially the same way, and with substantially the same advantages as in the gypsum treatment process described hereinabove. Since the composition of the aqueous phase will differ from that of the gypsum process so far as components other than methanol and water are concerned, one skilled in the art may make a different selection of material of construction and/or adjust the distillation conditions somewhat, e.g., to strip other low boilers, to strip water from high boilers, and/or to provide rectification as appropriate to separate methanol from other low boilers. However, these matters are within the skill of those familiar with the feed materials, reactions and material balance of a conventional papermaking process. But as in the gypsum process, methanol can be recovered in the overhead condensate either neat or at minimal moisture content, with little or no requirement for rectification to separate the methanol from water. Methanol distillation methods are well known to the art. To maximize methanol recovery and control emissions, a chilled coolant is preferably used in the overheads condenser.

The methanol can be directed to other uses in the papermaking facility, e.g., to "whiten" paper pulp, or offered on the market as a secondary product.

Avoidance of Solvents

Preparation of the products of the invention according to the various processes of the invention allows the use of organic or other non-aqueous solvents to be entirely avoided in the preparation of hydrophobic concrete, hydrophobic gypsum materials, and hydrophobic paper. Optionally, the aqueous alkoxysilane formulations used in the processes of the invention can contain minor proportions of water-miscible solvents, e.g., low molecular weight water-miscible solvents containing fewer than about 6 carbon atoms such as methanol, ethanol, acetonitrile, acetone, methyl ethyl ketone, diethyl ether, tetrahydrofuran etc. However, the aqueous formulations are preferably entirely devoid of any material proportions of organic or other non-aqueous solvents.

It is particularly preferred that the aqueous medium that is in contact with the substrate in the various processes of the invention, and which contains the alkoxysilane reagent, comprise no more than about 25 wt. % of any organic solvent, miscible or immiscible with water, when first brought into contact with the substrate. It is highly preferred that this aqueous medium contain no more than about 10 wt. %, more preferably no more than about 5 wt. %, and most preferably no more than about 2 wt. % of an organic solvent. These preferences specifically apply to the concrete mix prepared in the process for producing hydrophobic concrete, the gypsum or gypsum mix used in manufacturing hydrophobic drywall, and the pulp prepared for use in the process for producing hydrophobic paper. Ordinarily, there is no need for any organic solvent at all, but the allowance for minor fractions of a lower alcohol or other water-miscible solvent affords some flexibility in the selection and concentration of the alkoxysilane and the surfactants that may optionally be used in the aqueous medium.

In the course of the silanization reaction, the alcohol content of the aqueous phase rises due to the formation of by-product alcohol. By minimizing the introduction of any solvent into the process and maintaining relatively dilute concentrations of alkoxysilane, the alcohol content in the aqueous medium is preferably prevented from rising during the course of the reaction to more than 50%, more preferably to more than 30%, of the alcohol concentration at the lower explosive limit. In the case of a methoxysilane, including an alkyltrimethoxysilane such as methyltrimethoxysilane, the methanol content of the aqueous phase is preferably maintained below 5 wt. % on a liquid basis, preferably below about 3 wt. %.

Elimination of organic solvents avoids the toxicity associated with such solvents, as well as the flammability and explosion risks that they entail. This provides savings in the capital, operating and maintenance costs of manufacturing facilities for hydrophobic concrete, hydrophobic gypsum products and hydrophobic paper. In particular it avoids the need to design, install, operate and maintain solvent handling and solvent recovery facilities.

Elimination of organic solvents also serves to control the greenhouse gas emissions from the paper manufacturing facility.

Halosilane Embodiments

In accordance with the invention, it has further been discovered that halosilane formulations can be used in place of alkoxysilane formulations in the manufacture of paper. Although halosilanes react vigorously and prematurely with water, it has been discovered that the premature hydrolysis of halosilanes can be inhibited by providing an aqueous medium for the pulp which comprises a halosilane in a high concentration salt solution. The compositions of such solutions are described in detail hereinabove.

In practice of the papermaking process of the invention using a pulp in which the aqueous phase comprises a solution of a halosilane in a concentrated salt solution, the sheet or web produced by dewatering the pulp contains a substantial fraction of salt, even after the sheet is compressed and dried. However, in accordance with the invention, salt may be washed out of the sheet or web prior to calendering, or prior to drying, to produce a finished paper product of satisfactory properties. The finished product retains a modest salt content, but the properties of the paper product are satisfactory for many applications.

The following examples illustrate the invention.

EXAMPLE I

One and a half liters of tap water were placed in a pot and brought to a boil. Table salt (NaCl, sodium chloride) was slowly added to the boiling water until it no longer dissolved. The water continued to boil for 5 minutes to insure that it had become thoroughly saturated.

After cooling to room temperature, 25 ml of the saturated salt solution was added to a 50 ml beaker. To this, 1.2 ml of methyltrichlorosilane was slowly added and stirred into the saturated water. The solution was quite stable and the methyltrichlorosilane did not react with the water. A piece of maple wood was added to the solution and vigorously stirred. The dissolved methyltrichlorosilane reacted with the wood and produced hydrochloric acid (HCl) gas as a by-product. There was a slight exotherm observed. After 2 minutes, the wood was removed from the water solution and air-dried. Following drying, the wood had a slight white coating on it and the treated area was completely hydrophobic and readily repelled water. The water remained tightly beaded up and gradually evaporated after 30 minutes.

In order to determine the effectiveness of the treatment formulation, a comparative evaluation was performed on an untreated area of the maple wood sample. When applied, the droplets of water sat on the surface of the wood for one to two minutes and then were gradually absorbed into the bulk of the wood. This demonstrated the effectiveness of the treatment.

A second type of wood was used in example II below:

EXAMPLE II

A 100 ml aliquot of the prepared salt solution was introduced to a 250 ml beaker. To this, 5 ml of methyltrichlorosilane was slowly added and stirred. There was no reaction between the methyltrichlorosilane and the water. A 25 ml aliquot of this solution was placed in another 250 ml beaker. A piece of pine wood was added to the solution and vigorously stirred. The evolution of HCl was noticed. This was evidence that the wood had reacted with the methyltrichlorosilane. After 2 minutes, the wood was removed and air dried. Again there was a light white coating on the wood that came in contact with the treatment solution. Droplets of water were placed on the treated portion of the wood. Again, it was highly hydrophobic. For a basis of comparison, the untreated area of the wood readily absorbed the water as it was applied to the surface of the wood.

EXAMPLE III

A 25 ml aliquot of the aforementioned solution was transferred to a 250 ml beaker. This sample was slowly poured and spread over the surface of a piece of office paper. There was a slight evolution of HCl gas, again indicating that methyltrichlorosilane had reacted with the paper. The paper sample was air dried.

Upon drying, the paper was added to a plastic lined treatment box. Anhydrous ammonia was then added to the box and held for 15 minutes to neutralize the unreacted methyltrichlorosilane and HCl present on the surface of the paper. The paper was removed from the treatment box aired for 10 minutes. Water was applied to the surface of the water and rolled around freely. This indicates that the paper was completely hydrophobic. Again, for a basis of comparison, water was applied to a piece of untreated paper and the water was immediately absorbed into the paper.

EXAMPLE IV

A 25 ml aliquot of the solution described in Example II was added to a 250 ml beaker. A four inch long piece of ½"

thick plywood was introduced to the solution and stirred. A slight odor of HCl was noted, again indicating that the wood had reacted with the methyltrichlorosilane. The sample was removed from the treatment solution and placed in a 15% solution of ammonium hydroxide ($NH_4OH$) and neutralized for 5 minutes. The sample was removed from the $NH_4OH$ solution and air dried. The treated area of the wood had a light white color on it.

Upon drying, water was added to the treated portion of the wood sample. Again, it was highly hydrophobic and the water beaded up on the surface of the wood. For comparison, the water was readily absorbed into the untreated portion of the wood sample.

To further illustrate the versatility of this invention, another modification is provided in Example V, below:

EXAMPLE V

A 25 ml aliquot of the solution described in Example II was added to a 250 ml beaker. A four inch long piece of ½" Oriented Strand Board (OSB) was introduced to the solution and stirred. A slight odor of HCl was noted, again indicating that the wood had reacted with the methyltrichlorosilane. The sample was removed from the treatment solution and placed in a 5% solution of sodium hydroxide (NaOH) and neutralized for 5 minutes. The sample was removed from the NaOH solution and air dried. The treated area of the wood had a light white color on it.

Upon drying, water was added to the treated portion of the wood sample. Again, it was highly hydrophobic and the water beaded up on the surface of the wood. For comparison, the water was readily absorbed into the untreated portion of the wood sample.

The preparation of still another treatment solution is provided in Example VI, below.

EXAMPLE VI

A 100 ml of water was added to a 500 ml beaker. To this 15 g of Boric Acid ($B(OH)_3$) was added. The solution was warmed slightly and Table Salt was added until the solution was saturated. A 5 ml sample of methyltrichlorosilane was slowly added to the solution and stirred. No exotherm or reaction was observed. Ten ml of this solution was poured onto a piece of office paper. There was a slight odor of HCl, again denoting the reaction of the methyltrichlorosilane with the paper. The paper was air dried and neutralized in the anhydrous ammonia treatment box. The treated paper was highly hydrophobic, untreated paper readily absorbed added water.

A portion of the paper treated and neutralized in example VI was subjected to an open flame. The paper would not ignite or burn. It would only char. For a basis of comparison, an untreated piece of paper ignited immediately upon exposure to a flame. This demonstrated that the treated paper sample was fire resistant.

EXAMPLE VII

A 125 ml aliquot of water was placed inside a 250 ml beaker. To this, iron (III) chloride (Ferric Chloride) was added until it no longer dissolved in the water. To this solution, 3.75 ml of methyltrichlorosilane was slowly added while stirring. A piece of pine wood was placed in the solution and stirred. A small amount of HCl gas was observed coming off the surface of the water. This indicated that the methyltrichlorosilane reacted with wood sample. The wood was removed from the solution and air dried. Following the drying, water droplets were placed on the treated area of the sample. The wood was strongly hydrophobic and beaded nicely. The untreated portion of the wood sample readily absorbed the water placed on its surface. The treated area of the sample had a red to pink hue.

EXAMPLE VIII

A 125 ml aliquot of water was placed inside a 250 ml beaker. To this, copper (II) chloride (Cupric Chloride) was added until it no longer dissolved in the water. To this solution, 3.75 ml of methyltrichlorosilane was slowly added while stirring. A piece of pine wood was placed in the solution and stirred. A small amount of HCl gas was observed coming off the surface of the water. This indicated that the methyltrichlorosilane reacted with wood sample. The wood was removed from the solution and air dried. Following the drying, water droplets were placed on the treated area of the sample. The wood was strongly hydrophobic and beaded nicely. The untreated portion of the wood sample readily absorbed the water placed on its surface. The treated area of the sample had a blue hue.

EXAMPLE IX

Five liters of water was placed in a pot and brought to a boil. Potassium nitrate was slowly added and stirred until the solution became saturated. The solution was allowed to cool to room temperature and 3.75 liters of the prepared solution was placed in a plastic bucket. To this solution, 6.4 ml (5%) of methyltrichlorosilane was slowly added and stirred. A freshly cut Major League Baseball Bat introduced to a Pressurized Treatment vessel and sealed. A vacuum (15" Hg) was applied to treatment vessel and bat and held for 15 minutes. After 15 minutes, the vacuum was released using air. The methyltrichlorosilane/salt solution was then introduced to the treatment vessel. The pressure of the vessel was increased to 75 psi using nitrogen gas and held for 10 minutes. Following the pressure treatment the reactor pressure was released and safely vented to a retention tank. The treatment solution was then removed from treatment tank and safely stored in the retention tank. Again, the Bat was subjected to a vacuum (15" Hg) for 20 minutes to remove any excess methyltrichlorosilane/salt solution and HCl from the interior of the treated bat. The Bat was removed from the treatment tank and placed into the Bat Neutralization Tank. The tank was sealed and Anhydrous Ammonia was introduced to the Neutralization Vessel until a pressure of 75 psi was obtained. The Bat neutralization using anhydrous ammonia was held at the set pressure for 20 minutes and then the ammonia gas was safely vented to a second retention tank. The treated Bat was damp and had gained 257 g due to the treatment process. After 72 hours, the Bat had regained its original mass, 874 g. The surface of the Bat was covered with fine white powder that was easily removed with dry rag. The treated Bat had no detectable odor. The Bat was subjected to an in-house pendulum impact test and found to be more brittle than an untreated Bat.

EXAMPLE X

The aforementioned procedure was repeated using 0.96 ml (0.75%) of Methyltrichlorosilane in one gallon of said salt solution. This solution was added to the Bat Treatment Vessel and neutralized with 25 psi anhydrous ammonia. The resultant Bat possessed an impact strength that exceeded the impact strength of an untreated bat by a factor of ten to twenty.

EXAMPLE XI

The procedure mentioned in Examples VIII and IX was repeated using a neutralization solution of Ammonium Hydroxide ($NH_4OH$) or Sodium Hydroxide (NaOH) with concentrations of 20% and 5%, respectively. Both procedures resulted in Bats with impact test strengths that exceeded that of the untreated Bats by a factor eight to ten times.

EXAMPLE XII

Dried pieces of each treated and untreated wood samples were subjected to an open flame test using a gas torch. In every case, the untreated wood samples were ignited within ¼ to 1 minute and remained ignited until extinguished. The treated samples using the methyltrichlorosilane/salt solution or the methyltrichlorosilane/boron/salt solution showed no sign of igniting or sustaining combustion. The treatment solution containing the boron was especially effective at retarding the combustion of the treated wood.

This example demonstrated that the wood treated with an aqueous solution of methyltrichlorosilane, a boron containing material and a water soluble salt effectively renders the wood or wood product fire resistant.

EXAMPLE XIII

Representative pieces (½"×1"×3") of all of the wood samples were weighed, measured with a Micrometer and placed in Mason Jars containing water and sealed tightly for 72 hours (over a weekend). Untreated samples of each wood were also placed in separate Mason Jars to serve as reference samples. Following the 72 hour water treatment period, it was observed that the all of the treated wood samples were floating with 85% to 90% of the wood remaining above the water line. All of the untreated wood samples were either completely submerged at the bottom of the Jar or suspended just below the surface of the water line. All of the wood samples were removed from the jars, quickly surface dried with a paper towel and weighed. In every case, the wood samples treated with the methyltrichlorosilane and salt solution gained only four to seven grams of mass due to the water exposure. All of the untreated samples gained 24 to 37 grams of mass due to the water exposure.

All of the aforementioned wood samples were placed on separate glass plates and allowed to air dry. After four to six hours, the treated samples had returned to their original masses. The untreated samples took as long as 28 days to obtain their original masses.

Another important observation made after this test was dimensional stability of the dried samples. The treated samples appeared to be totally unchanged. This was confirmed by measuring them again with a Micrometer. The maximum deviation was 0.000 to 0.002". In contrast, the untreated samples had experienced a great deal of deformation. Maximum deviations for these samples ranged from 0.137 to 0.274". These differences personified the benefits of treating the wood with methyltrichlorosilane/salt solution.

EXAMPLE XIV

Treated and untreated Baseball Bats (maple) and pieces of Dimensional Lumber (pine) were cut axially and transversely to determine the level and extent of treatment. In every case, the materials treated with the methyltrichlorosilane/salt or the methyltrichlorosilane/salt/boron solution were completely hydrophobic from the outside of the sample to the center of the sample. Water placed on the treated wood surface would remain in tight beads until it evaporated. The untreated samples, Bats and Lumber, readily absorbed the water within one to two minutes. This demonstrated that the treated samples were effectively treated and water resistant.

EXAMPLE XV

A total of 100 g of pentane was added to a 250 ml beaker. To this 15 g of n-octyltriethoxysilane was added. Five drops of 12 N HCl was added and vigorously stirred with a 6"×½"×½" piece of Oriented Strand Board (OSB). The acid hydrolyzed the alkoxy-substituent and allowed the silane to react with the wood. The wood remained in contact with the solution for 10 minutes. The treated sample was removed from the solution and air dried.

Following drying, droplets of water were applied to the treated area of the wood. It was strongly hydrophobic. For a basis of comparison, water droplets were applied to an untreated portion of the wood and it was readily absorbed into the wood.

In another example, 100 g of pentane was added to a 250 ml beaker. To this 15 g of methyltrimethoxysilane was added. Five drops of 12 N HCl was added and vigorously stirred with a 6"×½"×½" piece of Plywood. The acid hydrolyzed the alkoxy-substituent and allowed the silane to react with the wood. The wood remained in contact with the solution for 10 minutes. The treated sample was removed from the solution and air dried.

Following drying, droplets of water were applied to the treated area of the wood. It was strongly hydrophobic. For a basis of comparison, water droplets were applied to an untreated portion of the wood and it was readily absorbed into the wood.

EXAMPLE XVI

Little or no wood sugar or sap deposits were found inside the reactor. No difficulties in transferring treatment solutions were encountered. This was an improvement over the aforementioned patent using pentane.

EXAMPLE XVII

A one gallon sample of the solution prepared in Example I was placed into a simple Garden Pump Sprayer. The solution was applied to all sides of a four foot piece of pine 2"×4" lumber. The treated wood sample was placed on a wooden rack and allowed to air dry. A small amount of HCl gas was observed evolving off the surface of the wood. Again, this indicated that the methyltrichlorosilane was reacting with the wood sample. Upon drying, the surface of the wood was thoroughly hydrophobic and readily repelled water. The penetration of the treatment solution was ⅛" to ¼".

Accordingly, it has been shown that methyltrichlorosilane solutions in water of 0.25% to 5%, containing a water soluble salt and or a water soluble boron containing material could completely penetrate a wood or wood product sample when pressurized from 15 to 75 psi. It has been shown that salts made from alkaline, alkaline earth and transition metals added to water allow silanes such as methyltrichlorosilane to be directly added to the water solution and used as a wood or wood product treatment product.

The aforementioned descriptions could be considered illustrative only of the principles and potential of the invention. Furthermore, because numerous iterations and modification would readily occur to those skilled in the art, it not desired to limit the invention to the exact construction, composition or applications described above. Therefore, all suitable modifications and equivalents that may be resorted or derived from the scope of the invention as defined by the claims that follow.

EXAMPLE XVIII

A 100 ml of water was added to a 250 ml beaker and warmed. Tribasic Potassium Phosphate was added until the solution became saturated. A 5 ml aliquot of Methyltrichlorosilane was slowly added to the saturated salt solution. A 6"×½"×½" piece of pine was used to vigorously stir the solution. The solution remained in contact with the wood sample for 2 minutes. The smell of HCl was observed, indicating that the silane had reacted with the wood. The wood sample was removed from the treatment solution and air dried. Following drying, droplets of water were applied to the treated area of wood. It was hydrophobic. For a basis of comparison, water droplets were applied to untreated areas of the wood. They were readily absorbed, demonstrating that the untreated area was not hydrophobic.

EXAMPLE XIX

A 100 ml of water was added to a 250 ml beaker and warmed. Potassium Nitrate was added until the solution became saturated. A 5 ml aliquot of Methyltrichlorosilane was slowly added to the saturated salt solution. A 6"×½"×½" piece of pine was used to vigorously stir the solution. The solution remained in contact with the wood sample for 2 minutes. The smell of HCl was observed, indicating that the silane had reacted with the wood. The wood sample was removed from the treatment solution and air dried. Following drying, droplets of water were applied to the treated area of wood. It was hydrophobic. For a basis of comparison, water droplets were applied to untreated areas of the wood. They were readily absorbed, demonstrating that the untreated area was not hydrophobic.

EXAMPLE XX

A 100 ml of water was added to a 250 ml beaker and warmed. Potassium Nitrite was added until the solution became saturated. A 5 ml aliquot of Methyltrichlorosilane was slowly added to the saturated salt solution. A 6"×½"×½" piece of pine was used to vigorously stir the solution. The solution remained in contact with the wood sample for 2 minutes. The smell of HCl was observed, indicating that the silane had reacted with the wood. The wood sample was removed from the treatment solution and air dried. Following drying, droplets of water were applied to the treated area of wood. It was hydrophobic. For a basis of comparison, water droplets were applied to untreated areas of the wood. They were readily absorbed, demonstrating that the untreated area was not hydrophobic.

EXAMPLE XXI

In this example, hydrophobic concrete was prepared by curing a concrete mixture in the presence of 10 wt. % aqueous solution of methyltrimethoxysilane. Water (884 ml) was placed in a 3.76 L mixing vessel. 12 N HCl (four drops) was added to the water and mixture was vigorously shaken to disperse the acid, thereby adjusting the pH of the aqueous medium to a value in the range of about 2.6 to about 2.9. An aliquot of methyltrimethoxysilane (156 ml) was added to the acidified water and the mixture vigorously shaken for 5 minutes. A 240 ml aliquot of the aqueous methyltrimethoxysilane solution was placed in a 500 ml beaker and set aside. A sample of dry concrete mix (2000 g) was placed into a wooden mold. The entire aliquot of silane solution (240 ml) was slowly added to the solid particulate concrete mix and gradually worked into consistent wet mixture.

The wet mixture was allowed to dry under ambient conditions for 24 hours. Following the curing period, the resulting concrete specimen was strongly hydrophobic and possessed a high contact angle (120°-128°).

Droplets of 6 N HCl were placed on the surface of the concrete specimen and the acid was observed to be non-reactive with the specimen. Similarly, droplets of 6 N NaOH were placed on the surface of the concrete sample and the caustic solution was also observed to be non-reactive. Acid and base were repetitively applied to the same locations for 10 days and it continued to be non-reactive.

EXAMPLE XXII

The preparation of this example was similar to that of Example XXI, except that the strength of the methyltrimethoxysilane solution was 5 wt. % rather than 10%. Water (922 ml) was placed into a 3.76 L mixing vessel. 12 N HCl (four drops) was added to the water and the mixture vigorously shaken. An aliquot of methyltrimethoxysilane (78 ml) was added to the water and the mixture vigorously shaken for 5 minutes. An aliquot of the aqueous methyltrimethoxysilane solution (240 ml) was placed in a 500 ml beaker and set aside. A sample of dry concrete mix (2000 g) was placed into a wooden mold. The entire aliquot of aqueous silane solution (240 ml) was slowly added to the particulate concrete mix and gradually worked into consistent wet mixture.

The wet mixture was allowed to dry under ambient conditions for 24 hours. Following the curing period, the cured concrete specimen was strongly hydrophobic and possessed a high contact angle (120°-128°).

Droplets of 6 N HCl were placed on the surface of the concrete sample and the acid was observed to be non-reactive with the specimen. Similarly, droplets of 6 N NaOH were placed on the surface of the concrete specimen and the caustic solution was also observed to be non-reactive. Acid and base solutions were repetitively applied to the same locations for 10 days and the specimen continued to be non-reactive.

EXAMPLE XXIII

The preparation of this example was similar to that of Examples XXI and XXII, except that the strength of the methyltrimethoxysilane solution was 2 wt. %. Water (968 ml) was placed into a 3.76 L mixing vessel. 12 N HCl (four drops) was added to the water and the mixture vigorously shaken. An aliquot of methyltrimethoxysilane (32 ml) was added to the water and the mixture vigorously shaken for 5 minutes. An aliquot of the aqueous methyltrimethoxysilane solution (240 ml) was placed in a 500 ml beaker and set aside. A sample of dry concrete mix (2000 g) was placed into a wooden mold. The entire aliquot of aqueous silane solution (240 ml) was slowly added to the particulate concrete mix and gradually worked into consistent wet mixture.

The wet mixture was allowed to dry under ambient conditions for 24 hours. Following the curing period, the cured concrete specimen was strongly hydrophobic and possessed a high contact angle (120°-128°).

Droplets of 6 N HCl were placed on the surface of the concrete sample and the acid was observed to be non-reactive with the specimen. Similarly, droplets of 6 N NaOH were placed on the surface of the concrete specimen and the caustic solution was also observed to be non-reactive. Acid and base solutions were repetitively applied to the same locations for 10 days and the specimen continued to be non-reactive.

EXAMPLE XXIV

The preparation of this example was similar to that of Examples XXI through XXIII, except that the strength of the methyltrimethoxysilane solution was 1 wt. %. Water (985 ml) was placed into a 3.76 L mixing vessel. 12 N HCl (four drops) was added to the water and the mixture vigorously shaken. An aliquot of methyltrimethoxysilane (15 ml) was added to the water and the mixture vigorously shaken for 5 minutes. An aliquot of the aqueous methyltrimethoxysilane solution (240 ml) was placed in a 500 ml beaker and set aside. A sample of dry concrete mix (2000 g) was placed into a wooden mold. The entire aliquot of aqueous silane solution (240 ml) was slowly added to the particulate concrete mix and gradually worked into consistent wet mixture.

The wet mixture was allowed to dry under ambient conditions for 24 hours. Following the curing period, the cured concrete specimen was strongly hydrophobic and possessed a high contact angle (120°-128°).

Droplets of 6 N HCl were placed on the surface of the concrete sample and the acid was observed to be non-reactive with the specimen. Similarly, droplets of 6 N NaOH were placed on the surface of the concrete specimen and the caustic solution was also observed to be non-reactive. Acid and base solutions were repetitively applied to the same locations for 10 days and the specimen continued to be non-reactive.

EXAMPLE XXV

The preparation of this example was similar to that of Examples XXI through XXIV, except that the strength of the methyltrimethoxysilane solution was 0.50 wt. %. Water (992.5 ml) was placed into a 3.76 L mixing vessel. 12 N HCl (four drops) was added to the water and the mixture vigorously shaken. An aliquot of methyltrimethoxysilane (7.5 ml) was added to the water and the mixture vigorously shaken for 5 minutes. An aliquot of the aqueous methyltrimethoxysilane solution (240 ml) was placed in a 500 ml beaker and set aside. A sample of dry concrete mix (2000 g) was placed into a wooden mold. The entire aliquot of aqueous silane solution (240 ml) was slowly added to the particulate concrete mix and gradually worked into consistent wet mixture.

The wet mixture was allowed to dry under ambient conditions for 24 hours. Following the curing period, the cured concrete specimen was strongly hydrophobic and possessed a high contact angle (120°-128°).

Droplets of 6 N HCl were placed on the surface of the concrete sample and the acid was observed to be non-reactive with the specimen. Similarly, droplets of 6 N NaOH were placed on the surface of the concrete specimen and the caustic solution was also observed to be non-reactive. Acid and base solutions were repetitively applied to the same locations for 10 days and the specimen continued to be non-reactive.

EXAMPLE XXVI

The preparation of this example was similar to that of Examples XXI through XXV, except that the strength of the methyltrimethoxysilane solution was 0.25 wt. %. Water (996.25 ml) was placed into a 3.76 L mixing vessel. 12 N HCl (four drops) was added to the water and the mixture vigorously shaken. An aliquot of methyltrimethoxysilane (3.75 ml) was added to the water and the mixture vigorously shaken for 5 minutes. An aliquot of the aqueous methyltrimethoxysilane solution (240 ml) was placed in a 500 ml beaker and set aside. A sample of dry concrete mix (2000 g) was placed into a wooden mold. The entire aliquot of aqueous silane solution (240 ml) was slowly added to the particulate concrete mix and gradually worked into consistent wet mixture.

The wet mixture was allowed to dry under ambient conditions for 24 hours. Following the curing period, the cured concrete specimen was strongly hydrophobic and possessed a high contact angle (120°-128°).

Droplets of 6 N HCl were placed on the surface of the concrete sample and the acid was observed to be non-reactive with the specimen. Similarly, droplets of 6 N NaOH were placed on the surface of the concrete specimen and the caustic solution was also observed to be non-reactive. Acid and base solutions were repetitively applied to the same locations for 10 days and the specimen continued to be non-reactive.

COMPARATIVE EXAMPLE XXVI

An untreated reference blank was prepared by adding a 240 ml aliquot of tap water to the 2000 g dry concrete sample, present in a wooden mold. The 240 ml of water was slowly added to the solid and gradually worked into consistent mixture.

The sample was allowed to dry under ambient conditions for 24 hours. Following the curing period, the sample was not hydrophobic and was readily absorbed into the cement pad.

Droplets of 6 N HCl were placed on the surface of the concrete sample and it bubbled vigorously, indicating that the cement was reactive in the presence of the applied HCl. A yellow residue was present on the application sites. Likewise, droplets of 6 N NaOH were placed on the surface of the concrete sample and it too was reactive. At the locations where the NaOH was applied, the cement was dissolved and the surface of the cement displayed a white residue. Repeated applications of the acid and base to the same locations over a 10 day period resulted in continuing degradation of the product.

The concrete pad specimens produced in this Example XXVI and the treated specimens of Examples XXI to XXV were allowed to cure for one week, after which all the specimens were removed from their molds. All of the specimens that had been treated with methyltrimethoxysilane samples displayed high contact angles on all sides and the bottoms of the formed cement pads. The untreated blank was reactive to HCl and NaOH on all sides.

Samples prepared with concentrations of 0.25% or less did not display hydrophobic characteristics and were not further explored. The best results were obtained at 2% with a range of +/−0.5%. Alkoxysilane concentrations as high as 10 wt. % can be used, but the water to cement ratio should be adjusted to compatible with the alkoxysilane level. For example, when an aqueous formulation containing 10 wt. % methyltrimethoxysilane was used at a water to cement ratio of 0.30, the concrete settled to a very dense, hard material that was strong and strongly hydrophobic. But when a 10% methyltrimethoxy-silane formulation was used at a water to cement ratio of 0.45, the cement washed away leaving only aggregate and loosely bonded sand. The dried concrete crumbled in the hand under modest squeezing pressure. In general, when an alkoxysilane was used, relatively less water was required to hydrate the dry concrete mix.

EXAMPLE XXVII

In this example, hydrophobic drywall was prepared by curing gypsum in the presence of 5 wt. % aqueous solution of methyltrimethoxysilane. Water (922 ml) was placed in a 3.76 L mixing vessel. 12 N HCl (four drops) was added to the water and mixture was vigorously shaken to disperse the acid. An aliquot of methyltrimethoxysilane (78 ml) was added to the acidified water and the mixture vigorously shaken for 5 minutes. A 250 ml aliquot of the aqueous methyltrimethoxysilane solution was placed in a 500 ml beaker and set aside.

A sample of dry particulate gypsum (100 g) was placed into 3.76 L plastic bucket. An aliquot of stored 5 wt. % silane solution was slowly added to the gypsum and gradually worked into consistent wet mixture. A total of 75 ml was added to the gypsum.

The mixture was removed from the bucket and placed on a piece of recycled paper. A second piece of paper was placed on top of the gypsum and the sample was pressed into a uniform thickness on the paper. The sample was allowed to dry for two hours under ambient conditions, then oven dried at 250° F. for two hours.

EXAMPLE XXVIII

In this example, hydrophobic drywall was prepared by curing gypsum in the presence of 2 wt. % aqueous solution of methyltrimethoxysilane. Water (968 ml) was placed in a 3.76 L mixing vessel. 12 N HCl (four drops) was added to the water and mixture was vigorously shaken to disperse the acid. An aliquot of methyltrimethoxysilane (32 ml) was added to the acidified water and the mixture vigorously shaken for 5 minutes. A 250 ml aliquot of the aqueous methyltrimethoxysilane solution was placed in a 500 ml beaker and set aside.

A sample of dry particulate gypsum (100 g) was placed into 3.76 L plastic bucket. An aliquot of stored 2 wt. % silane solution was slowly added to the gypsum and gradually worked into consistent wet mixture. A total of 60 ml was added to the gypsum.

The mixture was removed from the bucket and placed on a piece of recycled paper. A second piece of paper was placed on top of the gypsum and the sample was pressed into a uniform thickness on the paper. The sample then was allowed to dry for two hours under ambient conditions.

EXAMPLE XXIX

In this example, hydrophobic drywall was prepared by curing gypsum in the presence of 1 wt. % aqueous solution of methyltrimethoxysilane. Water (984 ml) was placed in a 3.76 L mixing vessel. 12 N HCl (four drops) was added to the water and mixture was vigorously shaken to disperse the acid. An aliquot of methyltrimethoxysilane (16 ml) was added to the acidified water and the mixture vigorously shaken for 5 minutes. A 250 ml aliquot of the aqueous methyltrimethoxysilane solution was placed in a 500 ml beaker and set aside.

A sample of dry particulate gypsum (100 g) was placed into 3.76 L plastic bucket. An aliquot of stored 1 wt. % silane solution was slowly added to the gypsum and gradually worked into consistent wet mixture. A total of 60 ml was added to the gypsum.

The mixture was removed from the bucket and placed on a piece of recycled paper. A second piece of paper was placed on top of the gypsum and the sample was pressed into a uniform thickness on the paper. The sample then was allowed to dry for two hours under ambient conditions.

COMPARATIVE EXAMPLE XXX

A sample of dry gypsum (100 g) was added to a 3.76 L plastic bucket. Tap water (50 ml) was added and the mixture was gradually worked into a consistent wet mixture. The mixture was removed from the bucket and placed on a piece of recycled paper. A second piece of paper was placed on top of the gypsum and the sample was pressed into a uniform thickness.

The sample was allowed to dry for two hours under ambient conditions. This sample was then compared to the drywall samples prepared according to Examples XXVII (cure in aqueous medium containing 5 wt. % methyltrimethoxysilane), XXVIII (cure in 2 wt. % silane), and XXIX (cure in 1 wt. % silane).

After two hours of drying under ambient conditions, the samples had all partially dried. The sample containing the 5% loading was hard but damp. The sample containing the 2% loading was soft and wet and the sample containing the 1% loading was still runny. The untreated reference sample was also quite runny.

All of the samples were placed in a drying oven set at 250° F. for two hours. Following this drying period, all of the samples were solid.

The hydrophobicity characteristics of the samples were determined. Droplets of water were added to the surface of the paper on top of the gypsum mat. All of the samples exhibited high contact angles and were quite hydrophobic. The paper tops were peeled back and water droplets were applied to the cured gypsum panels of all of the samples. The sample containing the 5% loading possessed the greatest hydrophobicity. The water droplets remained intact until they evaporated, ~40 minutes. The sample containing the 2% loading maintained high contact angles for 15 minutes and then the droplets broke down and the water was absorbed into the gypsum mat. The sample containing the 1% loading maintained its contact angle for 6 minutes prior to absorption of the water into the gypsum mat. The untreated reference blank showed no hydrophobicity at all and applied water was immediately absorbed.

Generally, the 5% loading provided the most favorable properties.

EXAMPLE XXXI

A 5% solution of Methyltrimethoxysilane was prepared by adding 13.1 ml of Methyltrimethoxysilane to 236.9 ml distilled water. The solution was vigorously agitated to homogenously distribute the silane within the aqueous medium.

A 200 g sample of commercially available gypsum was placed into a 3.76 Liter mixing vessel. The vessel agitator was engaged and the prepared silane solution was slowly added to the dry gypsum until the mixture was homogeneous (~140 to 150 ml). The hydrated paste was collected on a trowel and evenly distributed on a 4"×4" piece of white office paper. A second 4"×4" piece of white office paper was placed on top of the gypsum mat and pressed to form a smooth top.

The sample was allowed to air-dry over night.

EXAMPLE XXXII

A 5% solution of Methyltrimethoxysilane was prepared by adding 13.1 ml of Methyltrimethoxysilane to 236.9 ml distilled water. Two to four drops of 12 N HCl was added to the solution and the solution is vigorously agitated to homogenously distribute the silane within the aqueous medium.

A 200 g sample of commercially available gypsum was placed into a 3.76 Liter mixing vessel. The vessel agitator was engaged and the prepared silane solution was slowly added to the dry gypsum until the mixture was homogeneous (~140 to 150 ml). The hydrated paste was collected on a trowel and evenly distributed on a 4"×4" piece of white office paper. A second 4"×4" piece of white office paper was placed on top of the gypsum mat and pressed to form a smooth top.

The sample was allowed to air-dry over night.

EXAMPLE XXXIII

A 5% solution of Methyltrimethoxysilane was prepared by adding 13.1 ml of Methyltrimethoxysilane to 239.1 ml distilled water. Two to four drops of 12 N NaOH was added to the solution and the solution is vigorously agitated to homogenously distribute the silane within the aqueous medium.

After drying overnight, water droplets were dispersed across the surface of the prepared paper covered mats. In each case, the contact angle between the droplet and paper surface was high (~104° to 109°). This feature indicated that the paper was treated in-situ and was strongly hydrophobic.

The paper covering was removed from one side of the mat and again water droplets were dispersed across the surface of the mats. In each case, the contact angle between the droplet and paper surface was high (~104° to 109°). This feature indicated that the surface of the gypsum mat was treated and strongly hydrophobic.

The prepared mats were broken in half and water droplets were applied to the interior of the mats. All of the samples again displayed large contact angles, indicating that the interior of the gypsum mats were hydrophobic.

When compared to untreated reference samples, no contact angle was observed when droplets were applied to the paper, the mat surface or interior. This supports the claim that the treated samples were hydrophobic.

Representative samples of all of the preparations were placed in a container of water and submerged for 3 months. After the treated samples were removed, they still maintained their hydrophobicity and integrity. The untreated treated reference samples had become soft and lost all of their integrity. This supports the claim that the treated sample maintained their integrity after being saturated for 3 months.

EXAMPLE XXXIV

An aqueous 300 ml solution of 3% Methyltrimethoxysilane was prepared by adding 9.4 ml Methyltrimethoxysilane to 290.6 ml water.

Six pieces of copy paper, drywall facing paper and drywall backing paper were placed in the solution for 5 minutes. The samples were then removed from the solution and allowed to air dry for 15 minutes. Following air drying, the samples were placed in an oven set at 225° F. for 30 minutes to completely dry. The samples were then stored until used.

Four gypsum samples were prepared in this set of evaluations. The first two gypsum preparations contained a 3% Methyltrimethoxysilane loading. The last two samples contained no silane loading. The formulations used can be found in Table I. below.

TABLE I

| | Sample Formulations | | | | |
|---|---|---|---|---|---|
| Sample | Gypsum (g) | $H_2O$ (ml) | ATAS (%) | ATAS (ml) | Paper Used |
| 1 | 819 | 634.4 | 3 | 20.6 | Copy Pre-Treated |
| 2 | 819 | 634.4 | 3 | 20.6 | Wlbd. Pre-Treated (F/B) |
| 3 | 819 | 655 | 0 | 0 | Copy Pre-Treated |
| 4 | 819 | 655 | 0 | 0 | Wlbd. Pre-Treated (F/B) |

With each preparation, a piece of Teflon, covering the bottom of the mold was placed in the bottom of the mold. A piece of the pre-treated paper was placed in bottom of the mold. The gypsum formulation was prepared and poured into the mold and the backing paper was immediately placed on top of gypsum matt and a second piece of Teflon was placed on top of the backing paper and the sample was compressed to form a matt of uniform thickness.

The gypsum sample was allowed to remain in the mold for 30 minutes in order to allow the gypsum time to set. After setting, the gypsum drywall sample was removed from the mold and air dried for 1 hour. After air drying, the sample was placed in the oven set at 225° F. for two hours to dry.

After drying and cooling, the hydrophobic nature of the samples were determined by applying droplets of water were placed on the surface of the paper and gypsum matt.

After drying and cooling, water droplets were applied to the front and back surfaces of paper and gypsum matt. In every case, the contact angle of the water droplets ranged from 110° to 120°. This indicates that the paper was strongly hydrophobic.

When water droplets were applied to the gypsum matt surfaces of the first two samples, the water again formed beads with contact angles of 110° to 120°. When water droplets were applied to the gypsum matt surfaced of the second two samples, the water was immediately absorbed into gypsum matt.

The adhesion between the paper and the gypsum matt was excellent for all of the prepared samples.

This work demonstrates that the paper used in the preparation of a gypsum drywall product could be pre-treated with a solution containing methyltrimethoxysilane could be used in the preparation of gypsum drywall products that contain a silane attribute or not contain any silane in the gypsum matt formulation.

As expected all of the silane treated paper and gypsum matt surfaces were strongly hydrophobic. The neat gypsum preparations containing no silane elements were not hydrophobic and readily absorbed water.

This production scheme could be used to prepare an alternative commercial gypsum drywall product that contained no silane in the gypsum matrix.

The conclusion that could be derived from this experiment is that a viable gypsum drywall product with silane pre-treated paper coverings that possesses strong hydrophobic character could be prepared with or without the presence of a silane in the gypsum formulation.

EXAMPLE XXXV

Seven aqueous formulations comprising different combinations of methyltrimethoxysilane as sold under the trade designation Z-6070 and n-octyltrimethoxysilane as sold under the trade designation Z-6341 were prepared for treatment of paper pulp. The ratio of the combinations ranged from 1:4 to 4:1 with total combined concentrations ranging from 2 to 5%.

The formulations for the solutions prepared for this example are set forth in Table I.

TABLE I

| Silane Combination Ratios | | | | | | |
|---|---|---|---|---|---|---|
| % Mix Ratio | | 6070 | | 6341 | | |
| Sample | 6070 | 6341 | % | ml | % | ml | Total % |
| 1 | 1 | 1 | 1 | 3.38 | 1 | 2.71 | 2 |
| 2 | 2 | 1 | 2 | 7.78 | 1 | 2.71 | 3 |
| 3 | 3 | 1 | 3 | 10.14 | 1 | 2.71 | 4 |
| 4 | 4 | 1 | 4 | 13.52 | 1 | 2.71 | 5 |
| 5 | 1 | 2 | 1 | 3.38 | 2 | 5.42 | 3 |
| 6 | 1 | 3 | 1 | 3.38 | 3 | 8.13 | 4 |
| 7 | 1 | 4 | 1 | 3.38 | 4 | 10.84 | 5 |

In preparing each of samples 1 to 7, an aliquot of tap water (100 ml) was placed in a sealable jar. 12 N HCl (two to four drops) was added to the water and shaken. To acidified aqueous medium, the requisite amount of silane was placed into the jar and the jar was vigorously shaken for 5 minutes. The volume of the sample was increased with water until it reached 120 ml (4 oz.). The jar was sealed and the sample was well shaken again to homogenize the mixture and begin the hydrolysis of the silane with the acid.

Each of the prepared liquid sample was gradually combined with a 51.4 sample of damp commercial paper pulp in a plastic bucket. The sample was worked until it became homogeneous. The sample was placed between two sheets of aluminum foil and pressed into shape between two pie pans. Once the treated paper pulp had been formed between the sheets of aluminum foil, the top sheet of foil was removed and the sample allowed to air dry over a weekend. Due to the high humidity, evaporation over the weekend was slow to non-existent and all of the samples were still very wet. They were then placed in the oven set at 250° F. for two hours. The samples were checked and still damp. The samples were returned to the oven for another hour and they were still not dry. After remaining in the oven for another hour, all of the samples were dry.

The dried samples were weighed and properly stored. Each sample was individually combined with a quantity of water three times its mass. The sample was vigorously stirred and agitated in order to break up the large and small pieces and then transferred to a piece of parchment paper. The dry mass of each of the paper pulp samples after treatment with the indicated alkoxysilane solution and the amount of water added in preparation of the reconstituted slurry for application to parchment paper are set forth in Table II.

TABLE II

| Dry Sample Masses and Reconstitution Water Content | | |
|---|---|---|
| Sample | Mass (g) | Water (g) |
| 1 | 38 | 114 |
| 2 | 40 | 120 |
| 3 | 41 | 123 |
| 4 | 44 | 132 |
| 5 | 39 | 117 |
| 6 | 47 | 141 |
| 7 | 48 | 144 |

After application to parchment paper, the treated pulp paper samples were placed between two pieces of stainless steel foil and passed through the 2-roll press until the roll gauge indicated that the thickness was 0.000".

The samples were then individually placed in the oven set at 200° F. for 1 hour to dry.

Results

Pressing the first three samples yielded paper products that were fragmented and somewhat partitioned. The remaining four samples resulted in material that qualified as a paper product.

Upon drying, all of the samples were strongly hydrophobic. The results demonstrate that paper pulp can be treated and dried and then reconstituted with more water and reformed into useable paper products that would be strongly hydrophobic.

As described hereinabove, a finished paper product may also be water-proofed by treatment with an aqueous solution of an alkoxysilane or a solution of a halosilane in an aqueous medium that is substantially saturated with a salt. While the halosilane process is highly advantageous, it requires dewatering and drying steps to initially produce the paper and further dewatering and drying steps after treatment with the silane solution. In accordance with the preferred process of the instant invention as described in the immediately foregoing examples, the preparation and hydrophobic treatment of paper are integrated into a single process requiring only a single dewatering and a single drying step.

The preferred process of the invention also provides a great deal of latitude for a myriad of applications. For example, Kapstone pulp can be treated as it was being manufactured and immediately pressed into the desired size and shape.

Recycled paper can be treated and used as insulation that is water proof and fire resistant. Boron can be added to enhance the fire resistance of the insulation. These products should be eligible for "Green Certification" since they are made from recycled materials and can then be recycled again. Hydrophobic treatment of insulation combined with hydrophobic treatment of gypsum drywall prevents the collapse of ceilings from water damage.

It should be noted that the hydrophobic nature of these treated samples was accomplished with a combined silane concentration of 2% to 5%.

Conclusions

The conclusions that can be derived from this series of experiments are as follows;

The combination of the two alkyltrialkoxysilanes resulted in the production of a simple paper product that was strongly hydrophobic after the paper pulp was pre-treated and dried prior to reformulation.

Given that success was obtained with the pre-treatment of the pulp and subsequent reconstitution, this process can also proceed well in a commercial process wherein the chemical(s) are introduced to the pulp prior to the final paper manufacturing step.

The concentrations used in this evaluation were between 2% and 5%, based on the water weight.

Preparations made with combined silane concentrations below 2% were ineffective and did not display hydrophobic characteristics.

EXAMPLE XXXVI

Two combined alkyltrialkoxysilane solutions were prepared at 2% and 5% with equivalent additions of each silane.

The solutions were added to wet paper pulp as noted above and then passed through the 2-roll press and oven dried.

The dried samples were strongly hydrophobic. Water droplets rolled around on the surface of the prepared paper sample.

This process replicated a commercial paper plant production. It too was very effective.

EXAMPLE XXXVII

A 2% solution of Methyltrimethoxysilane is prepared by adding 10.47 ml of Methyltrimethoxysilane to 489.53 ml distilled water. The solution is vigorously agitated to homogenously distribute the silane within the aqueous medium.

A 215 g sample of finely divided recycled office paper was place in a 3.76 L mixing vessel. The vessel agitator was engaged and the entire prepared silane solution was slowly added to the paper mixture. The solvent/paper mixture maintained a 5 minute contact time. The solvent/paper mixture was then removed from the mixing vessel and placed on a piece of parchment paper. A second piece of parchment paper was placed on top of the mixture and the sample was pressed to an evenly distributed thickness of approximately 0.5".

The sample was then placed on top of a piece of stainless steel foil. A second piece of foil was then placed on top of the paper/mixture sample. The sample was passed through a two-roll press until a thickness of 0.04" was obtained. After milling, most of the treatment solution was been removed. The sample was then placed in an oven set at 107° C. for 30 minutes to completely dry.

EXAMPLE XXXVIII

A 2% solution of Methyltrimethoxysilane is prepared by adding 10.47 ml of Methyltrimethoxysilane to 489.53 ml distilled water. Two to four drops of 12 N HCl was added to the solution and the solution is vigorously agitated to homogenously distribute the silane within the aqueous medium.

A 215 g sample of finely divided recycled newspaper was place in a 3.76 L mixing vessel. The vessel agitator was engaged and the entire prepared silane solution was slowly added to the paper mixture. The solvent/paper mixture maintained a 5 minute contact time. The solvent/paper mixture was then removed from the mixing vessel and placed on a piece of parchment paper. A second piece of parchment paper was placed on top of the mixture and the sample was pressed to an evenly distributed thickness of approximately 0.5".

The sample was then placed on top of a piece of stainless steel foil. A second piece of foil was then placed on top of the paper/mixture sample. The sample was passed through a two-roll press until a thickness of 0.04" was obtained. After milling, most of the treatment solution was been removed. The sample was then placed in an oven set at 107° C. for 30 minutes to completely dry.

EXAMPLE XXXIX

A 2% solution of Methyltrimethoxysilane is prepared by adding 10.47 ml of Methyltrimethoxysilane to 489.53 ml distilled water. Two to four drops of 12 N NaOH was added to the solution and the solution is vigorously agitated to homogenously distribute the silane within the aqueous medium.

A 215 g sample of virgin commercial paper pulp was place in a 3.76 L mixing vessel. The vessel agitator was engaged and the entire prepared silane solution was slowly added to the paper mixture. The solvent/paper mixture maintained a 5 minute contact time. The solvent/paper mixture was then removed from the mixing vessel and placed on a piece of parchment paper. A second piece of parchment paper was placed on top of the mixture and the sample was pressed to an evenly distributed thickness of approximately 0.5".

The sample was then placed on top of a piece of stainless steel foil. A second piece of foil was then placed on top of the paper/mixture sample. The sample was passed through a two-roll press until a thickness of 0.04" was obtained. After milling, most of the treatment solution was been removed. The sample was then placed in an oven set at 107° C. for 30 minutes to completely dry.

EXAMPLE XL

A 3% solution of Methyltrimethoxysilane is prepared by adding 15.74 ml of Methyltrimethoxysilane to 484.26 ml distilled water. The solution is vigorously agitated to homogenously distribute the silane within the aqueous medium.

Eight 4"×4" pieces of cardboard were placed in the bottom of 3.76 L mixing vessel. The entire prepared silane solution was slowly added to the paper samples. The solvent/paper mixture maintained a 5 minute contact time. The solvent was decanted off the cardboard samples. The paper samples were then placed in an oven set at 107° C. for one hour until dried.

EXAMPLE XLI

Four sample gypsum formulations were prepared, each containing a methyltrimethoxysilane. The compositions of the four sample formulations are set forth in the table below:

TABLE I

| | Gypsum Formulation | | | |
|---|---|---|---|---|
| Sample | Gypsum (g) | H20 (ml) | % ATAS | ATAS (ml) |
| 1 | 819 | 656 | 0 | 0 |
| 2 | 819 | 639 | 2.5 | 17 |
| 3 | 819 | 632 | 3.5 | 24 |
| 4 | 819 | 625 | 4.5 | 31 |

Each of these samples was used to treat paper facing and backing sheets for drywall. The treated paper sheets were applied as facing and backing sheets to a gypsum drywall panel. The resultant treated drywall products were then tested for mold formation according to ASTM D 3273.

Fresh soil was seeded with fungal spores of *Aspergillus niger*, ATCC #6275, *Penicillium citrinium*, ATCC #9849, and *Aureobasdium pullulans*, ATCC #9348 and allowed to grow. After two weeks, exposed PDA (potato dextrose sugar) plates were placed in the soil chamber for one hour to confirm that fungal spores were being produced by the fungi seeded in the soil. The soil was then placed in a D 3273 chamber maintained at 32.5±1° C. and a relative humidity between 95% and 98%. The test samples were hung in the D 3273 chamber with three pieces of untreated generic wallboard (drywall) to confirm validity of the fungal growth and defacement and rated according to the scale shown below:

| ASTM D 3273 Grading Scale | |
|---|---|
| Rating | Definition |
| 10 | No Defacement |
| 9 | 90% clear (1-10% defaced) |
| 8 | 80% clear (11-20% defaced) |
| 7 | 70% clear (21-30% defaced) |
| 6 | 60% clear (31-40% defaced) |
| 5 | 50% clear (41-50% defaced) |
| 4 | 40% clear (51-60% defaced) |
| 3 | 30% clear (61-70% defaced) |
| 2 | 20% clear (71-80% defaced) |
| 1 | 10% clear (81-90% defaced) |
| 0 | 0% clear (91-100% defaced) |

Tabulated against the concentration of methyltrimethoxysilane in the treatment solution, the results were as follows:

| Sample Description | | Week 1 (1/17) Front/Back | Week 2 (1/24) Front/Back | Week 3 (1/31) Front/Back | Week 4 (2/7) Front/Back |
|---|---|---|---|---|---|
| Sample I | 1A | 10/10 | 7/9 | 5/8 | 3/8 |
| | 1B | 10/10 | 7/9 | 6/6 | 6/4 |
| | 1C | 10/10 | 7/9 | 6/7 | 4/6 |
| Sample II | 2A | 10/10 | 6/8 | 4/6 | 3/5 |
| | 2B | 10/10 | 6/8 | 4/5 | 3/4 |
| | 2C | 10/10 | 8/8 | 7/7 | 6/6 |
| Sample III | 3A | 10/10 | 7/6 | 6/5 | 5/4 |
| | 3B | 10/10 | 6/5 | 5/4 | 4/2 |
| | 3C | 10/10 | 6/6 | 5/5 | 5/4 |
| Sample IV | 4A | 10/10 | 6/7 | 6/5 | 5/4 |
| | 4B | 10/10 | 5/7 | 5/6 | 5/6 |
| | 4C | 10/10 | 6/8 | 5/7 | 5/6 |
| Controls and Conditions | | | | | |
| Untreated wallboard | | 9/9 | 6/8 | 3/7 | 2/6 |
| Untreated wallboard | | 9/9 | 6/7 | 4/5 | 3/4 |
| Untreated wallboard | | 9/9 | 6/8 | 3/6 | 3/4 |
| Temperature ° C. (32.5 ± 1° C.) | | 32.5 | 32.2 | 32.5 | 32.4 |
| Relative Humidity (95-98%) | | 97.5 | 96.7 | 95.8 | 97.9 |

After 4 weeks incubation in the D 3273 chamber, the results for the test were as set forth in the table below. The control pieces performed as expected, confirming the validity of the test. These results pertain only to the samples tested.

EXAMPLE XLII

On a commercial scale, 41.7 tons of paper pulp, 97.2 tons of water and 2 tons of Methyltrimethoxysilane are fed into the affluent Head Chest of the paper line. This combination of reagents results in a 2% solution of Methyltrimethoxysilane. The temperature of the solution in the Head Chest is maintained at 40°-45° C. The solution/paper contact time is approximately 15 minutes. The effluent Head Chest water line is diverted to distillation tank. The temperature of the distillation tank is maintained at 65°-75° C.

The methanol vapor will cleanly separate from the aqueous medium and be conveyed to a condensing cold finger where the methanol vapor is converted to liquid methanol. The methanol liquid can then be used "in-house" as a paper whitening agent or stored for repackaging and distribution as chemical reagent.

The paper will continue down the production line until it is dried to remove any residual of methanol or water.

After drying, water droplets were dispersed across the surface of the paper. The contact angle between droplets and the paper surface ranged from 104° to 109°. An untreated reference sample of paper showed no contact angle and spread across the surface of the paper. This supports the claim that all of the treated paper samples were strongly hydrophobic.

After drying, all of the treated paper samples were examined using a 45° Angle Flame Test. None of the treated paper samples sustained a flame and quickly self-extinguished themselves. An untreated reference sample sustained a burning flame and burned until it was entirely consumed. This establishes that all of the treated paper samples were fire resistant.

After drying, all of the treated paper samples were examined by adding droplets of India Blue or India Black Ink to the paper surfaces. The droplets maintain large contact angles (104° to 109°) until the water in the droplets evaporated. A sharp and well defined dried ink border was obtained. No diffusion into the paper was observed. Untreated reference samples readily diffused the ink across the surface of the paper. This supports the claim that all of the treated paper samples were sized and did not diffuse the applied ink droplets.

After drying, all of the treated paper samples were maintained in a dark, damp and warm environment for several weeks. None of the treated paper samples developed mold or mildew formations in or on the surface of the samples. The untreated reference sample exhibited the growth of mold and mildew within two weeks. This demonstrates that none of the treated paper samples would allow or sustain mold or mildew growth.

After drying, all of the treated paper samples were examined by performing Tensile Strength determinations. The treated samples surpassed the untreated reference samples by a margin of 40% to 110% when the samples were dry.

After the samples were re-moistened, the Tensile Strength of the treated samples surpassed the untreated samples by 70% to 300%. This shows that all of the treated paper samples had enhanced Tensile Strengths.

What is claimed is:

1. A process for the manufacture of hydrophobic paper comprising:
    delivering a pulp comprising a slurry of cellulosic fibers in an aqueous medium comprising an alkoxysilane to a screen for forming a sheet comprising fibers of said pulp;
    compressing and dewatering said sheet;
    drying said compressed sheet of fibers to produce a sheet of paper that is resistant to water.

2. A process as set forth in claim 1 comprising preparing said slurry by mixing cellulosic fiber, water and said alkoxysilane.

3. A process as set forth in claim 1 wherein said fibers are contacted in the pulp with an alkoxysilane component comprising an alkoxysilane corresponding to the formula:

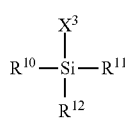

Formula II wherein $X^3$ is hydroxy or alkoxy, and each of $R^{10}$, $R^{11}$ and $R^{12}$ is independently selected from the group consisting of hydroxy, alkoxy, alkyl and hydrogen, and at least one of $R^{10}$, $R^{11}$, $R^{12}$ and $X^3$ is alkoxy.

4. A process as set forth in claim 3 wherein said alkoxysilane comprises a dialkoxysilane or trialkoxysilane.

5. A process as set forth in claim 3 wherein the aqueous medium does not contain aminoalkylsilane(s) and/or an epoxyalkylsilane(s) in a weight ratio to the sum of alkoxysilane(s) of Formula II greater than about 1:4.

6. A process as set forth in claim 1 wherein preparation of said pulp comprises contacting said fibers with an aqueous silane formulation comprising between about 0.25 and about 15 wt. % of an alkoxysilane component.

7. A process as set forth in claim 6 wherein preparation of said pulp comprises contacting said fibers with an aqueous silane formulation comprising between about 0.50 and about 10 wt. % of an alkoxysilane component.

8. A process as set forth in claim 1 wherein the pulp is prepared in an aqueous medium that does not contain more than about 2 wt. % of an organic solvent.

9. A process as set forth in claim 1 wherein the alkoxysilane comprises a trimethoxyalkylsilane and the methanol content of the aqueous medium is maintained below 5 wt. % on a liquid basis.

10. A process as set forth in claim 1 wherein said aqueous medium has a pH less than about 4 or greater than about 10.

11. A process as set forth in claim 1 wherein the dry paper sheet contains a silane residue in a proportion between about 0.5 and about 10 wt. %.

12. A process as set forth in claim 11 wherein the silane residue is substantially uniformly distributed throughout the paper.

13. A process as set forth in claim 11 wherein said silane residue produced by the reaction of the alkoxysilane with cellulose of said fibers is bonded to cellulosic fibers of the paper product predominantly through Si—O— bonds.

14. A process as set forth in claim 11 wherein the paper product is substantially free of amine, imine, amide or imide linkages between the silane residue and cellulosic fibers of the paper product.

15. A process as set forth in claim 1 wherein the fibers of said pulp are contacted with an alkoxysilane component that is substantially free of moieties comprising quaternary ammonium ion, quaternary phosphonium ion, pyridinium ion, sulfonate ion, or carboxylate ion.

16. A process as set forth in claim 1 wherein hydrophobic paper is manufactured in a continuous mode, the process comprising:
    delivering said pulp to a wire for forming a web comprising fibers of said pulp;
    compressing and dewatering said fibrous web;
    drying said web of compressed fibers to produce a web of paper that is resistant to water.

17. A process as set forth in claim 1 wherein the alkoxysilane is thermally activated for reaction with cellulose of said fibers.

18. A process as set forth in claim 17 wherein the alkoxysilane is activated during drying of the paper for reaction with cellulose of said fibers.

19. A process as set forth in claim 1 wherein the content of carbohydrate additive of the paper product is not greater than about 0.5 lbs./ton.

20. A process as set forth in claim 1 wherein the total nutrient content of starch, added carbohydrate, added oils or other nutrients for microorganisms in the paper product is not greater than about 2.5 lbs./ton.

21. A process for the manufacture of hydrophobic paper comprising:
    preparing a pulp comprising a slurry of cellulosic fibers in an aqueous medium, the preparation of said pulp comprising contacting cellulosic fibers with an aqueous medium containing between about 0.50 and about 10% by weight of a dialkoxysilane or trialkoxysilane that is substantially free of moieties comprising quaternary ammonium ion, quaternary phosphonium ion, pyridinium ion or carboxylate ion;
    delivering said pulp to a screen for forming a sheet comprising fibers of said pulp;
    compressing and dewatering said sheet;
    drying said compressed sheet of fibers to produce a sheet of paper in which a silane residue is substantially uniformly distributed and bonded to cellulosic fibers within said sheet predominantly through S—O— bonds, said sheet being resistant to water, having a total content of starch, added carbohydrate, added oils or other nutrients for microorganisms of less than 2.5 lbs. per ton, and being substantially free of amine, imine, amide or imide linkages between the silane residue and cellulosic fibers of said paper sheet.

22. A process as set forth in claim 21 comprising:
    adding an acid or base and said alkoxysilane to an aqueous medium to provide an activated aqueous alkoxysilane formulation of other than neutral pH for treatment of said fibers; and
    simultaneously with or promptly after preparation of said activated formulation, mixing said fibers with said formulation.

23. A process as set forth in claim 22 wherein said activated formulation is mixed with said fibers to produce an activated pulp within a period not greater than about 30 minutes after said alkoxysilane and said acid or base are combined to provide the activated formulation.

24. A process for the manufacture of hydrophobic paper comprising:
preparing a pilot pulp comprising cellulosic fibers dispersed in an aqueous medium;
delivering the pilot pulp to a screen for forming a pilot fibrous sheet comprising fibers of said pilot pulp;
compressing and dewatering said pilot sheet;
drying said compressed pilot sheet of fibers to produce a sheet of crude paper; and
disintegrating said sheet of crude paper in the presence of an aqueous medium comprising an alkoxysilane component to produce a reconstituted pulp from which the hydrophobic paper is produced.

25. A process as set forth in claim 18 further comprising:
delivering the reconstituted pulp to a screen for forming a reconstituted sheet comprising fibers of the reconstituted pulp;
compressing and drying said reconstituted sheet; and
drying said compressed reconstituted sheet of fibers to produce a sheet of paper that is resistant to water.

* * * * *